United States Patent [19]
Willert et al.

[11] Patent Number: 5,950,788
[45] Date of Patent: Sep. 14, 1999

[54] OPERATING DEVICE FOR OPERATING A FRICTION CLUTCH

[75] Inventors: Jörg Willert; Jürgen Liebler, both of Schweinfurt; Joachim Lindner, Hambach, all of Germany

[73] Assignee: Mannesmann Sachs AG, Schweinfurt, Germany

[21] Appl. No.: 09/056,340

[22] Filed: Apr. 7, 1998

[30] Foreign Application Priority Data

Apr. 7, 1997 [DE] Germany .............................. 197 14 226

[51] Int. Cl.⁶ .............................. F16D 19/00; F16D 13/44
[52] U.S. Cl. .................................. 192/85 CA; 192/85 C; 192/91 R; 192/91 A
[58] Field of Search ............................ 192/85 CA, 91 A, 192/85 C, 91 R, 109 F; 60/325, 533, 537, 542; 91/472, 476, 479, 491, 494, 499

[56] References Cited

U.S. PATENT DOCUMENTS

| | | | |
|---|---|---|---|
| 3,177,777 | 4/1965 | Kenrick | 192/85 C |
| 4,328,883 | 5/1982 | Shellhause | 192/85 CA |
| 4,779,713 | 10/1988 | Tomala et al. | 192/85 CA |
| 5,094,079 | 3/1992 | Leigh-Monstevens et al. | 192/3.58 |
| 5,390,497 | 2/1995 | Cottam | 192/85 R |
| 5,850,898 | 12/1998 | Bohme et al. | 192/85 R |

FOREIGN PATENT DOCUMENTS

| | | |
|---|---|---|
| 33 21 578 | 12/1984 | Germany . |
| 41 20 643 | 12/1992 | Germany . |
| 195 16 404 | 11/1996 | Germany . |
| 2 323 906 | 10/1998 | United Kingdom . |

*Primary Examiner*—Rodney H. Bonck
*Assistant Examiner*—Tisha D. Waddell
*Attorney, Agent, or Firm*—Cohen, Pontani, Lieberman & Pavane

[57] ABSTRACT

An operating device of a friction clutch arranged in the drive train of a motor vehicle, having a positioning servo arrangement with a pressure medium power cylinder arrangement located inside the housing bell and acting on a clutch release bearing arrangement. The invention that the pressure medium power cylinder arrangement, an input element arrangement associated with a control valve and, in some cases, additional anti-tilting moment devices are embodied and/or adjusted to each other and, in some cases, to the clutch so that the force resulting from the forces exercised by the pressure medium power cylinder arrangement, the input element arrangement and, in some cases, the additional anti-tilting moment devices directly or indirectly on the clutch release bearing arrangement or the clutch release bearing arrangement side of the pressure medium power cylinder arrangement, during at least one clutch operation phase, are at least substantially coaxial to the clutch axis.

76 Claims, 24 Drawing Sheets

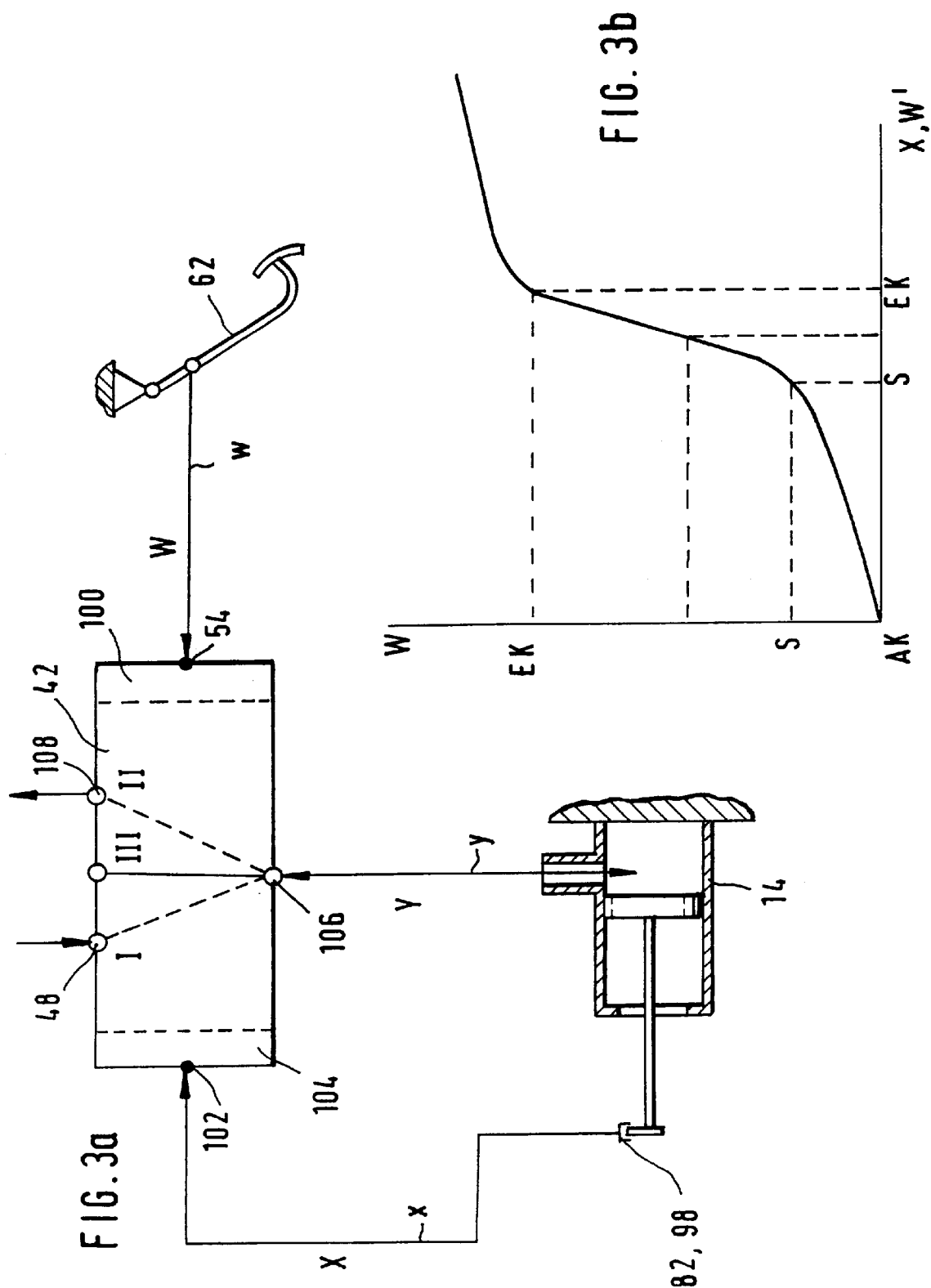

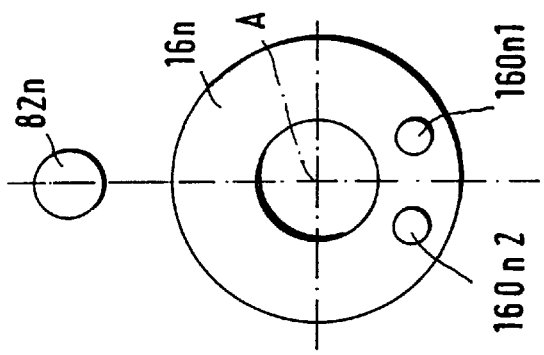
FIG. 17d  FIG. 17c  FIG. 17b  FIG. 17a
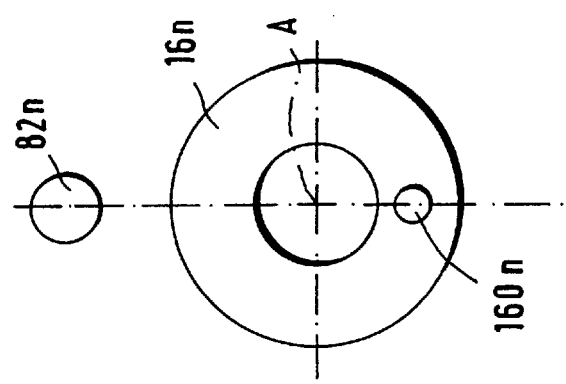
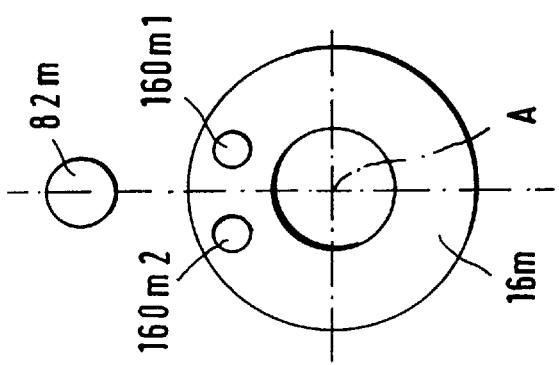
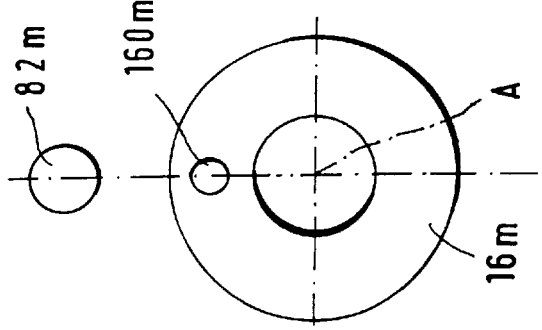

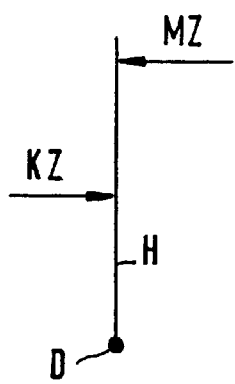
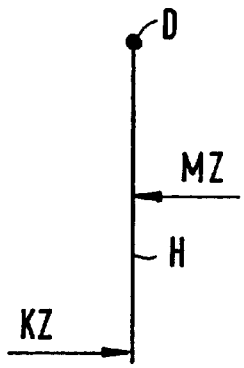
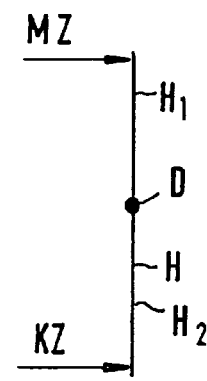
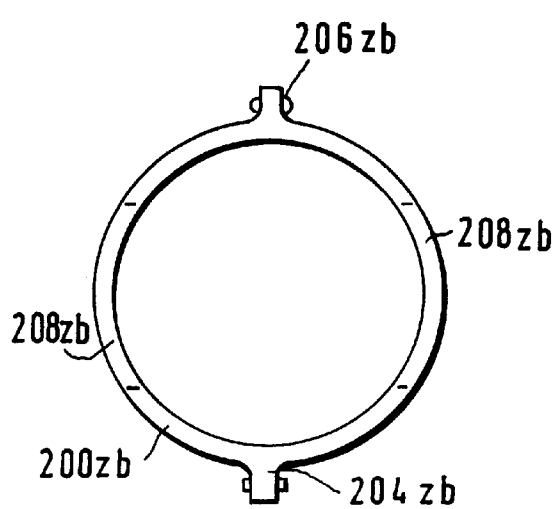
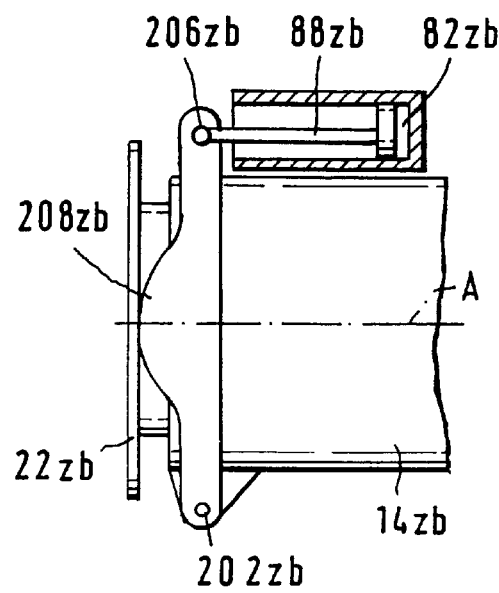

5,950,788

OPERATING DEVICE FOR OPERATING A FRICTION CLUTCH

BACKGROUND OF THE INVENTION

1. Field of the Invention

The invention relates to an operating device for a friction clutch arranged in a housing bell between an internal combustion engine and a transmission in the drive train of a motor vehicle, especially a commercial vehicle. Such an operating device includes a clutch release bearing arrangement that can be moved substantially coaxially to the friction clutch for the purpose of operating the friction clutch, and a positioning servo arrangement with a pressure medium power cylinder arrangement that acts upon the clutch release bearing arrangement and can be operated, via a control valve connected to a pressure medium source, in dependence on a control variable, which represents a target position, and a current variable that represents the axial position of the clutch release bearing arrangement.

2. Discussion of the Prior Art

An operating device of this type is known, for example, from DE 33 21 578 C2. The known operating device has a positioning servo arrangement in the form of a low pressure servo power amplifier. The servo power amplifier, designed as a low pressure brake power amplifier, is embodied integrally with a pneumatic power cylinder and a control valve, and is arranged outside of the housing bell. Two working chambers of the pneumatic power cylinder are separated from each other by an axially movable piston and an elastic diaphragm. The first working chamber, designed as a low pressure chamber, is attached to an intake line system of the internal combustion engine. The other working chamber, serving as a control chamber, can be connected by means of the control valve either to the low pressure chamber or, via a pressure compensation opening, to the atmosphere. The low pressure servo power amplifier is operated via a control rod, which hits against a valve body of the control valve and can be moved axially via a cam driven by means of an electric motor. An axial movement of the control rod activates the control valve so that the piston follows the movement of the control rod in a power-amplified manner. The movement of the piston, via a hydraulic input cylinder, acts on an output cylinder that is connected to the input cylinder and is arranged outside the housing bell. The output cylinder, in turn, acts on a disengaging fork associated with the clutch release bearing arrangement.

Furthermore, an operating device of the aforementioned type is known that has a pneumatic power cylinder as the pressure medium power cylinder arrangement. The operating device is attached externally to the housing bell in the form of an integral unit that comprises the pneumatic power cylinder, a hydraulic output cylinder and the control valve. The piston of the pneumatic power cylinder is located on a rod element that forms the piston of the hydraulic output cylinder. The rod element is connected to a tappet that extends into the interior of the housing bell and acts upon a disengaging fork associated with the clutch release bearing arrangement. Attached to the hydraulic output cylinder are an input cylinder, which is operable by a clutch pedal, and a control input of the control valve. The control valve, depending on a hydraulic pressure applied at the control input, controls the supply of pressurized air to the pneumatic power cylinder or the release of air from the pneumatic power cylinder so that a predetermined hydraulic pressure determined by a compression spring arrangement of the control valve is established at the control input. The hydraulic output cylinder serves as a measurement cylinder which detects the position of the rod element and thus indirectly detects the position of the clutch release bearing arrangement. During operation of the input cylinder, forces are exercised directly on the rod element and thus on the clutch release bearing arrangement via the hydraulic output cylinder serving as a measurement cylinder, in addition to the operating forces of the pneumatic power cylinder resulting from the supply of pressurized air to the power cylinder.

The idea has arisen of marketing an operating device of the aforementioned type, in which the pressure medium power cylinder arrangement is located inside the housing bell. In such an arrangement, in principle, a control valve of the type described above can be used with a hydraulic output cylinder that serves as the measurement cylinder and, upon activation of the control valve, exercises forces on the clutch release bearing arrangement. However, this idea is problematic, insofar as centrical pickup of the disengagement signal on the power cylinder arrangement is impossible, at least when the power cylinder arrangement, as preferred, has, as the pressure medium main cylinder, a pressure medium ring cylinder that encompasses the clutch axis. The disengagement signal must thus generally be picked up extra-centrically on the pressure medium power cylinder arrangement or, in some cases, on the clutch release bearing arrangement, which leads to the occurrence of lateral forces or tilting moments. Such lateral forces or tilting moments are extremely problematic, because they can lead to self-locking of the pressure medium power cylinder arrangement, so that the functional reliability of the operating device is no longer ensured under all circumstances.

SUMMARY OF THE INVENTION

It is an object of the present invention to provide an operating device of the aforementioned type with a pressure medium power cylinder arrangement located inside the housing bell, in which the danger of self-locking of the cylinder due to lateral forces or tilting moments stemming from the pickup of the disengagement signal (current variable) is substantially reduced, if not totally eliminated.

Pursuant to this object, and others which will become apparent hereafter, one aspect of the present invention resides in a pressure medium power cylinder arrangement located inside the housing bell and comprises at least one pressure medium main cylinder, especially a pressure medium ring cylinder that encompasses the clutch axis (Feature A). The positioning servo arrangement includes an input element arrangement, which is associated with the clutch release bearing arrangement or the clutch release bearing arrangement side of the pressure medium power cylinder arrangement, for the purpose of detecting the current variable (Feature B). The pressure medium power cylinder arrangement, the input element arrangement and, in some cases, additional anti-tilting moment means are embodied in such a way and/or adjusted to one another and, in some cases, to the clutch in such a way that the forces exercised by these device parts and by the clutch directly or indirectly on the clutch release bearing arrangement or the clutch release bearing arrangement side of the pressure medium power cylinder arrangement, at least during at least one clutch operation phase, produce no substantial resultant tilting moment that acts on the clutch release bearing arrangement side of the pressure medium power cylinder arrangement. Especially no tilting moment is exercised that is significant with respect to the danger of self-locking of the pressure medium power cylinder arrangement, relative to the stationary side of the pressure medium power cylinder arrangement (Feature C).

With respect to Feature C, the invention also provides that the force resulting from the forces exercised by the pressure medium power cylinder arrangement, the input element arrangement, and, in some cases, the additional anti-tilting moment means, directly or indirectly on the clutch release bearing arrangement or the clutch release bearing arrangement side of the pressure medium power cylinder arrangement, at least during at least one clutch operation phase, is substantially coaxial to the clutch axis (Feature D).

According to the invention, self-locking due to lateral forces or tilting moments stemming from the pickup of the disengagement signal is thus ruled out, so that high functional reliability of the operating device is achieved. This is true even when the positioning servo arrangement comprises a mechanical positioning control arrangement or a hydraulic positioning control arrangement, in the case of which the forces exercised by the input element arrangement directly or indirectly on the clutch release bearing arrangement side of the pressure medium power cylinder arrangement can be comparatively large.

The input element arrangement can comprise a mechanically connected input element that detects, directly or indirectly, the position of the clutch release bearing arrangement, and/or a hydraulic measurement cylinder arrangement preferably arranged inside the housing bell that detects, directly or indirectly, the position of the clutch release bearing arrangement. The invention makes it possible to easily provide a hydraulic measurement cylinder arrangement that has exactly one measurement cylinder that is preferably axis-parallel to the clutch axis.

To avoid the danger that the pressure medium power cylinder arrangement will self-lock due to lateral forces or tilting moments stemming from the pickup of the disengagement signal, it is possible to pursue multiple travels, individually or parallel to one another. In a first embodiment, the pressure medium power cylinder arrangement (in some cases, in interaction with the force of action of the clutch on the clutch release bearing arrangement) and/or the anti-tilting moment means provided for this purpose will produce, at least during at least one clutch operation phase, a corresponding counter tilting moment (Feature E) for the approximate or substantially complete compensation of a tilting moment produced by the input element arrangement, especially the measurement cylinder, and acting directly or indirectly on the clutch release bearing arrangement side of the pressure medium power cylinder arrangement, especially a tilting moment significant in terms of the danger of self-locking of the pressure medium force cylinder arrangement.

To this end, the pressure medium power cylinder arrangement includes at least one pressure medium auxiliary cylinder, especially a pressure medium auxiliary cylinder arranged substantially axis-parallel to the clutch axis, which produces, at least during the clutch operation phase, the counter tilting moment or a contribution to the counter tilting moment. The pressure medium ring cylinder can be arranged eccentric to the clutch axis so as to produce, at least during the clutch operation phase, the counter tilting moment or a contribution to the counter tilting moment. In this regard, the pressure medium ring cylinder has cylinder walls concentric to a ring cylinder axis and is arranged with the ring cylinder axis offset relative to the clutch axis, whereby the ring cylinder axis is substantially parallel to the clutch axis. Alternatively, the pressure medium ring cylinder can have a radially outer ring cylinder wall concentric to a first ring cylinder axis and a radially inner ring cylinder wall concentric to a second ring cylinder axis, whereby the inner and outer ring cylinder walls are eccentric to each other. The two ring cylinder axes are substantially parallel to each other, whereby at least one of these ring cylinder axes is substantially parallel to the clutch axis.

In a further embodiment of the inventor special anti-tilting moment means are provided to achieve at least partial compensation for the tilting moment. For this purpose, the anti-tilting moment means comprises a compensation spring arrangement that acts between the stationary side of the pressure medium power cylinder arrangement, on the one hand, and the clutch release bearing arrangement side of the pressure medium power cylinder arrangement or the clutch release bearing arrangement, on the other. The spring arrangement produces, at least during the clutch operation phase, the counter tilting moment or a contribution to the counter tilting moment.

The compensation spring arrangement includes an anti-parallel force spring arrangement, which, for the purpose of producing the counter tilting moment or the contribution to the counter tilting moment, exercises, at least during the clutch operation phase, a compensation force directly or indirectly on the clutch release bearing arrangement or the clutch release bearing arrangement side of the pressure medium power cylinder arrangement. The compensation force has force components directed substantially opposite to the input element arrangement force exercised by the input element arrangement directly or indirectly on the clutch release bearing arrangement or the clutch release bearing arrangement side of the pressure medium power cylinder arrangement. In this regard, it is preferable that, upon disengagement of the clutch release bearing arrangement side of the pressure medium power cylinder arrangement, the increasingly tensible anti-parallel force spring arrangement, act, relative to the clutch axis, on the same side as the input element arrangement on the pressure medium power cylinder arrangement or the clutch release bearing arrangement, and preferably produce a compensation force that is anti-parallel to the input element arrangement force. In general, it holds that the compensation force and the input element arrangement force can lie on a common plane that contains the clutch axis and/or a pressure medium cylinder arrangement axis, whereby the compensation force is preferably coaxial to the input element arrangement axis.

Additionally or alternatively to the anti-parallel force spring arrangement, the compensation spring arrangement includes a parallel force spring arrangement, which, for the purpose of producing the counter tilting moment or a contribution to the counter tilting moment, exercises, at least during the clutch operation phase, a compensation force directly or indirectly on the clutch release bearing arrangement or the clutch release bearing arrangement side of the pressure medium power cylinder arrangement. The compensation force has force components directed substantially in the same direction as the input element arrangement force exercised directly or indirectly by the input element arrangement on the clutch release bearing arrangement or the clutch release bearing arrangement side of the pressure medium power cylinder arrangement. In this regard, it is preferable that, upon engagement of the clutch release bearing arrangement side of the pressure medium power cylinder arrangement, the increasingly tensible parallel force spring arrangement act, relative to the clutch axis, on the side opposite to the input element arrangement on the pressure medium power cylinder arrangement or the clutch release bearing arrangement and preferably produce a compensation force that is parallel to the input element arrangement force. In general, it holds that the compensation force and the input element arrangement force can lie on a common plane that contains the clutch axis and/or a pressure medium cylinder arrangement axis, whereby the compensation force axis, in relation to the clutch axis or the pressure medium cylinder arrangement axis, is preferably symmetrical to the input element arrangement axis.

In still a further embodiment both an anti-parallel force spring arrangement and a parallel force spring arrangement be provided, the first of which is tensible during disengagement and the second of which is tensible during engagement of the clutch release bearing arrangement side of the pressure medium power cylinder arrangement. Given suitable adjustment of the two spring arrangements to each other, it is possible for the two spring arrangements, at least during the clutch operation phase, to jointly produce a substantially constant counter tilting moment or a substantial contribution to the constant counter tilting moment regardless of the clutch release position.

The compensation spring arrangement, especially the anti-parallel force spring arrangement and/or the parallel force spring arrangement, can comprise a compression spring arrangement with at least one compression spring. The compression spring arrangement itself can comprise at least one compression spring preloaded in a rest position of the pressure medium power cylinder arrangement, whereby the rest position preferably corresponds to the engaged state of the pressure medium power cylinder arrangement.

The compression spring arrangement can comprise at least one serial connection of at least two compression springs of different spring hardnesses. In this regard, it is preferable that at least one of the serially connected compression springs, preferably a harder compression spring, not be preloaded in the rest position, and at least one other compression spring, preferably a softer spring, be preloaded.

The compensation spring arrangement, especially the anti-parallel force spring arrangement and/or the parallel force spring arrangement, includes a tension spring arrangement with at least one tension spring. The tension spring arrangement itself can comprise at least one tension spring that is preloaded in a rest position of the pressure medium power cylinder arrangement, whereby the rest position preferably corresponds to the engaged state of the pressure medium power cylinder arrangement.

The tension spring arrangement includes at least one serial connection of at least two tension springs of different spring preloads. In this regard, it is preferable that at least one of the serially connected compression springs, preferably a harder compression spring, not be preloaded in the rest position, and at least one other compression spring, preferably a softer spring, be preloaded.

The compensation spring arrangement can be associated with switching means, by means of which the compensation force exercised by the compensation spring arrangement, especially the anti-parallel force spring arrangement and/or the parallel force spring arrangement, directly or indirectly on the clutch release bearing arrangement or the clutch release bearing arrangement side of the pressure medium power cylinder arrangement can be switched on and off as a function of the clutch release position of the pressure medium power cylinder arrangement. This is of great advantage, especially when the compensation spring arrangement is preloaded in a rest position of the pressure medium power cylinder arrangement. By means of the switching means, it is then possible for the compensation force of the compensation spring arrangement to be switched off in the rest position, whereby the rest position preferably corresponds to the engaged state of the pressure medium power cylinder arrangement. Switching means of this type are provided, in particular, when the input element arrangement, in the rest position, exercises no force or only reduced force directly or indirectly on the clutch release bearing arrangement side of the pressure medium power cylinder arrangement. Tilting moments resulting from an excessively large compensation force in the rest position thus cannot occur. The described switching means will be used, in particular, in clutches with wear compensation means, in which, because of the wear compensation, it is easily possible to achieve a substantially constant association between the rest position, on the one hand, and the clutch release positions, in which the switching means activate and deactivate the compensation force, on the other hand.

Instead of or in addition to the compensation spring arrangement, the anti-tilting moment means can comprise a mass distribution device of the pressure medium power cylinder arrangement or of the clutch release bearing arrangement and/or at least one separate weight element, whose weight force produces, at least during the clutch operation phase, the counter tilting moment or the contribution to the counter tilting moment that acts directly or indirectly, for example, via a transmission arrangement, especially a lever arrangement, on the clutch release bearing arrangement or the clutch release bearing arrangement side of the pressure medium force cylinder arrangement.

Instead of compensating for the tilting moment or even in addition to doing so, it is possible, in a further embodiment of the invention, to take measures to reduce or avoid lateral force. According to the invention, it is proposed that, in an operating device with a pressure medium power cylinder arrangement located inside the housing bell as in Feature A and a positioning servo arrangement as in Feature B, for the purpose of avoiding or minimizing a tilting moment produced by the input element arrangement, especially the measurement cylinder, directly or indirectly on the clutch release bearing arrangement side of the pressure medium power cylinder arrangement, application radius reduction means in the form of anti-tilting moment means are provided. The radius reduction means reduce the application radius relative to the pressure medium cylinder arrangement axis or the clutch axis that is determinant for the tilting moment, relative to a radial distance between a movement axis of an input element connected in terms of movement to the clutch release bearing arrangement of the pressure medium power cylinder arrangement and the pressure medium power cylinder arrangement axis or the clutch axis (Feature F). The application radius reduction means includes a coupling point that does not transmit any tilting moment or transmits tilting moment only to a reduced extent between a carrier element connected in terms of movement, particularly, rigidly connected or integrally embodied with the clutch release bearing arrangement or the clutch release bearing arrangement side of the pressure medium power cylinder arrangement, and a follower element coupled in terms of movement to the input element, particularly, rigidly connected or integrally embodied therewith, whereby the coupling point is offset relative to the movement axis in the direction of the clutch axis. The coupling point can be simply embodied, for example, as an articulated point or as a stop point effective in one or both axial directions.

Alternatively or in addition to reducing the lateral force by reducing the application radius, it is also possible to reduce the force exercised by the input element as such. For this purpose, another embodiment of the invention provides that, given an operating device with a pressure medium power cylinder arrangement arranged inside the housing bell as in Feature A and a positioning servo arrangement as in Feature B, there is, for the purpose of avoiding or minimizing a tilting moment produced by the input element arrangement, especially the measurement cylinder, and acting directly or indirectly on the clutch release bearing arrangement side of the pressure medium power cylinder arrangement, anti-tilting moment means integrated into the input element arrangement. The anti-tilting moment means counteract a reaction force exercised by a detection arrangement of the input element arrangement on an input element connected in terms of movement to the clutch release bearing arrangement side of the pressure medium power cylinder arrangement, especially the hydraulic pressure exercised by the hydraulic medium of the measurement cylinder on its piston connected in terms of movement to the input element or embodied integrally therewith. The anti-tilting means integrated into the input element include a counter force spring arrangement, which, as applicable, can be part of a compensation spring arrangement, as described above. The counter force spring arrangement can be embodied in keeping with the described anti-parallel force spring arrangement or the described compression spring arrangement or tension spring arrangement.

According to a still a further embodiment of the invention, in the ideal case, lateral forces or tilting moments can be substantially completely avoided. For this purpose, in an operating device with a pressure medium power cylinder arrangement located inside the housing bell as per Feature A and a positioning servo arrangement as per Feature B, there is, for the purpose of avoiding or minimizing a tilting moment produced by the input element arrangement, especially the measurement cylinder, and acting directly or indirectly on the clutch release bearing arrangement side of the pressure medium power cylinder arrangement, transmission means in the form of anti-tilting moment means. The transmission means connect an input element not coaxial to the clutch axis in terms of movement and in a manner free of tilting moment to the clutch release bearing arrangement or the clutch release bearing arrangement side of the pressure medium power cylinder arrangement, with a resultant force substantially coaxial to the clutch axis of the force or forces exercised by the transmission means on the clutch release bearing arrangement or the clutch release bearing arrangement side of the pressure medium power cylinder arrangement. Preferably, the transmission means includes a lever arrangement with a lever supported in a pivotable fashion on a stationary support point, whereby a first lever arm has a fork section or a ring section that encompasses the clutch axis and acts with two application sections on two counter application sections, which are substantially diametrically opposed relative to the clutch axis, of the clutch release bearing arrangement or the clutch release bearing arrangement side of the pressure medium power cylinder arrangement.

The lever is supported on a supporting end of the first lever arm, and the input element can be coupled to a coupling section of the first lever arm. The application sections can then lie between the supporting end, on the one hand, and the coupling section, on the other. Alternatively, the coupling section can lie between the supporting end, on the one hand, and the application sections, on the other. It is proposed, in a further advantageous embodiment, that the lever be supported on a supporting section between the first lever arm and a second lever arm, and that the input element be coupled to a coupling section of the second lever arm.

According to another approach for avoiding or minimizing lateral forces and avoiding tilting moments as much as possible, it is proposed according to the invention that the input element arrangement be embodied substantially symmnetrical to the clutch axis. It is proposed as especially preferred that the measurement cylinder arrangement comprise a ring measurement cylinder substantially concentric to the clutch axis or a plurality of measurement cylinders axis-parallel to the clutch axis, which are arranged distributed around the clutch axis at the same circumferential angle and at the same radial distance.

If other provisions to compensate for a tilting moment are not expressly made, it is preferred, for all indicated variants of the compensation, reduction or avoidance of a tilting moment that acts on the clutch release bearing arrangement side of the pressure medium power cylinder arrangement, especially a tilting moment significant with respect to the danger of self-locking of the pressure medium power cylinder arrangement, that the pressure medium power cylinder arrangement be embodied, for the purpose of avoiding tilting moment, symmetrical to the clutch axis. For this purpose, the pressure medium power cylinder arrangement includes a pressure medium ring cylinder symmetrical to the clutch axis. If a tilting moment is to be compensated for by the pressure medium power cylinder arrangement itself, then the pressure medium power cylinder arrangement, especially when it has a pressure medium ring cylinder that is symmetrical and concentric to the clutch axis, includes at least one pressure medium auxiliary cylinder, which is offset radially outward relative to the pressure medium ring cylinder and is axis-parallel to the clutch axis. Alternatively, the pressure medium power cylinder arrangement can also comprise a plurality of pressure medium cylinders, which are axis-parallel to the clutch axis and preferably are distributed around the clutch axis at the same circumferential angle and at the same radial distance, as well as, in some cases, at least one pressure medium auxiliary cylinder that is offset radially outward relative to the pressure medium cylinders and is axis-parallel to the clutch axis.

It is also proposed that at least one pressure medium cylinder that is axis-parallel to the clutch axis, especially a pressure medium auxiliary cylinder, of the pressure medium power cylinder arrangement, and at least one measurement cylinder axis that is parallel to the clutch axis of the measurement cylinder arrangement, have approximately the same radial distance from the clutch axis and/or lie diametrically opposite to each other in pairs, relative to the clutch axis, particularly for the purpose of compensating at least partially for a tilting moment stemming from the measurement cylinder and a counter tilting moment stemming from the pressure medium cylinder.

With respect to the embodiment of the control valves, many variants are conceivable. Preferably, the control valve comprises a valve arrangement that can be switched, depending on a differential value associated with the current value and the control value, between a first control state, which connects the pressure medium cylinder arrangement to the pressure medium source, and a second control state, which connects the pressure medium power cylinder arrangement to a pressure compensation opening, and, in some cases, a third control state, in which the pressure medium power cylinder arrangement is substantially sealed in a pressure-medium-tight fashion. The control valve can have a port hydraulically connected to a measurement cylinder arrangement of the input element arrangement and can maintain, by means of switching between the aforementioned control states, at least during the clutch operating phase, a substantially constant hydraulic pressure in the measurement cylinder arrangement, dependent, as applicable, on the pressure medium pressure and/or on the movement direction of the clutch release bearing arrangement side of the pressure medium power cylinder arrangement. The control valve can simply be a control valve that operates in the fashion of a pressure-maintaining valve. Despite the frequent relatively large reaction forces in control valves of this type that can be exercised by a detection arrangement, especially the measurement cylinder arrangement, on an input element connected in terms of movement to the pressure medium power cylinder arrangement, according to the invention, problems that result from excessively large tilting moments induced in the pressure medium power cylinder arrangement are avoided, and, above all, there is no danger of self-locking of the pressure medium power cylinder arrangement.

The control valve can be arranged outside the housing bell or, at least, partly inside the housing bell. However, regardless of its arrangement inside or outside the housing bell, the control valve is preferably accessible from the outside, and in particular, removable, in the case of a housing bell connected to the internal combustion engine and the transmission. The pressure medium is preferably a pneumatic pressure medium.

With respect to further possible advantageous features and further possible constructive details of the operating device according to the invention, reference is made to U.S. patent application Ser. No. 08/873,041, filed Jun. 11, 1997, whose entire disclosed contents are incorporated herein by reference. This earlier application is referred to in what follows as the "reference application." In particular, the features and constructive details indicated in the reference application are considered advantageous further developments of the operating device according to the invention.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 3 shows, schematically, in FIG. 3a, the control circuit of an operating device according to the invention with a position control device, and in FIG. 3b, a control signal-target position curve, according to which the positioning of the clutch release bearing arrangement of the operating device in FIG. 3a can be carried out;

FIGS. 15a–d, 16a–d and 17a–d, are schematic sectional views, with a sectional plane orthogonal to the clutch axis, through a pressure medium power cylinder arrangement, comprising a pressure medium ring cylinder with an associated hydraulic measurement cylinder, indicating the different possible placements of compensation springs for the purpose of compensating for a tilting moment produced by the hydraulic measurement cylinder;

FIGS. 28a–c show three embodiments of how the force exercised by a hydraulic measurement cylinder can be transmitted via a lever arrangement, without producing tilting moments, to the movable part of a pressure medium power cylinder arrangement;

FIGS. 29a-b show an example of the embodiment in FIG. 28a;

DETAILED DESCRIPTION OF THE PREFERRED EMBODIMENTS

Figure 1:
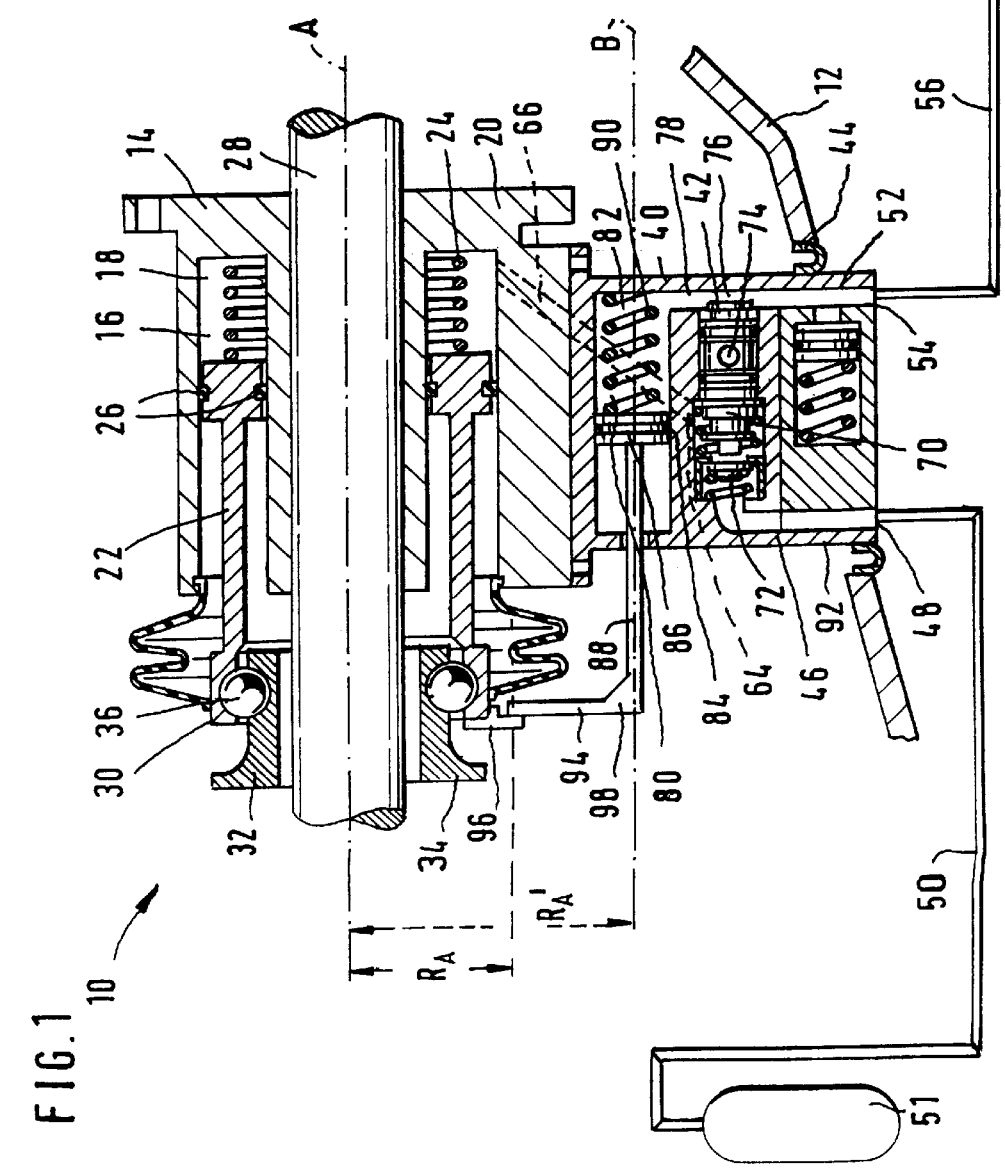
FIG. 1 shows, in a schematic lateral view, a first embodiment of an operating device according to the invention with a pressure medium ring cylinder, especially a pneumatic ring cylinder, which has anti-tilting moment means in the form of application radius reduction means.

FIG. 1 shows, schematically, an operating device 10 according to the invention in a first embodiment, for a friction clutch, here, a pressed clutch, arranged in a housing bell 12 between an internal combustion engine and a transmission in the drive train of a motor vehicle. The operating device 10 comprises a pressure medium power cylinder arrangement which is embodied as a structural unit, here, a pneumatic power cylinder arrangement, which can also be referred to as the operating cylinder unit 14. The operating cylinder unit 14 comprises a pressure medium main cylinder in the form of a pressure medium ring cylinder, here, a pneumatic ring cylinder 16. The ring cylinder 16 consists of a ring-cylindrical recess 18 in a stationary body part 20, and a pneumatic ring piston element 22. The pneumatic ring piston element 22 is prestressed by spring means 24 in the direction of the clutch (not shown) (to the left in FIG. 1), and carries sealing rings 26 for sealing the ring cylinder space of the pneumatic ring cylinder 16.

The pneumatic ring cylinder 16 and the pneumatic ring piston element 22 are arranged coaxial to a clutch axis A. The body part 20 has an axial bore, through which a transmission input shaft 28 extends coaxial to the clutch axis A.

A ring section 30 of the pneumatic ring piston element 22 on the clutch-side end of the ring piston element constitutes a disengaging ring 30 of a clutch release bearing arrangement 32, which also comprises a disengaging ring 34, which is rotatable relative to the disengaging ring 30 and rotates along with the clutch, and a ball bearing 36 that permits a relative movement between the two disengaging rings 30, 34. The clutch release bearing arrangement 32, during operation of the operating device, acts, in a known manner, especially via diaphragm flexible tongues of a diaphragm spring serving as a clutch spring, on the clutch so as to disengage the clutch for the purpose of interrupting the power flow between the transmission and the internal combustion engine.

The operating cylinder unit 14 carries a control valve unit 40 attached detachably to the operating cylinder unit 14. The control valve unit 40 comprises a known control valve 42 that functions according to the pressure-maintaining principle. The control valve unit 40 is arranged so that it projects through an associated opening 44 in the housing bell 12 beyond the bell and can be removed if the housing bell is connected to the internal combustion engine and the transmission.

The control valve 42 is connected to a pneumatic source 51 via a pneumatic line 46 inside the control valve unit 40, a pneumatic port 48 on the section of the control valve unit 40 projecting over the outside of the housing bell 12, and another pneumatic line 50. The control valve 42 is also connected to a control signal transmitter unit 60 via a line 52 inside the control valve unit 40, a port 54 on the section of the control valve unit 40 projecting over the outside of the housing bell 12, and another line 56. The control signal transmitter unit 60 is, in the present case, a clutch pedal arrangement 60 with a clutch pedal 62 that is designed to transmit a control signal in the form of a hydraulic signal via the line 56, the port 54 and the line 52 to the control valve 42. The lines 52, 56, accordingly, are hydraulic lines, which are connected via the port 54 designed as a hydraulic port.

The control valve 42 is also connected via a pneumatic line 64 inside the control valve unit 40 and a pneumatic line 66 inside the operating cylinder unit 14 to the ring cylinder space 18 of the pneumatic ring cylinder 16. Furthermore, the control valve 42 is connected via another pneumatic line (not shown) inside the control valve unit 40 to a pressure compensation opening (not shown) of the control valve unit 40.

The control valve 42 comprises a valve body 70 mounted so as to be movable along a valve axis in a bore of the control valve unit 40. The valve body 70 has an axial bore (not shown) closable by a cover element 72 in the direction of the pneumatic line 46 and also has radial bores that open into the axial bore, of which one radial bore 74 is shown in FIG. 1.

In FIG. 1, the valve body 70, under the action of a compression spring that acts upon it, is moved to the right relative to the cover element 72, so that a de-airing connection is established between the ring cylinder space of the pneumatic ring cylinder 16 and the de-airing opening via the pneumatic lines 66, 64, a valve space accommodating the valve body 70, the aforementioned axial bore and the aforementioned radial bores 74 in the valve body 70. If the valve body 70 is moved so far to the left that the cover element 72 closes the axial bore, but is not yet lifted, against the spring force of an associated compression spring acting upon it, from a cover seat, the ring space of the pneumatic ring cylinder 16 is sealed in a pneumatically-tight fashion. If the valve body 70, taking along the cover element 72 as the latter lifts from its cover seat, is moved farther to the left, then an airing connection is established between the pneumatic line 46 and the ring space of the pneumatic ring cylinder 16 via the valve space and the pneumatic lines 64 and 66.

The position assumed by the valve body 70 depends on the hydraulic pressure in a hydraulic chamber 76 of the control valve 42 formed by a hydraulic line section. The hydraulic pressure acts on the valve body 70 in the sense of shifting the valve body 70 to the left against the spring force of the compression spring acting on the valve body 70. The hydraulic chamber 76 is connected via a hydraulic line section 78 to the cylinder space 80 of a hydraulic measurement cylinder 82. The measurement cylinder 82 comprises a piston 86, equipped with a sealing ring 84, on a piston rod 88.

The piston 86 limiting the cylinder space of the hydraulic measurement cylinder 82 can be moved along a movement axis B parallel to the clutch axis A and coaxial to the piston rod 88, and is prestressed by a compression spring 90 in the direction of the clutch, i.e., in the disengagement direction of the clutch release bearing arrangement 32 during operation of the clutch for the purpose of release. The piston rod 88 protrudes through an opening in the control valve unit 40 over a body or a housing 92 of the control valve unit 40 in the direction of the clutch, and has on its clutch-side end a follower element 94 embodied in one piece with the piston rod 88 in the form of a rod-shaped arm that projects from the piston rod 88 in the direction of the clutch axis A. The piston rod 88, the follower element 94 and the piston 86 can be designed as parts of an integral or even a one-piece input element of an input element arrangement formed by the hydraulic measurement cylinder 82.

The ring section 30 of the pneumatic ring piston element 22 carries a rigidly attached carrier 96 with a carrier arm projecting radially outward, against which the follower element 94 is prestressed with a free end by the pressure force of the compression spring 90. The carrier arm 96 thus forms a stop for the follower element 94. During disengagement of the pneumatic ring piston element 22, the input element 98 comprising the piston 86, the piston rod 88 and the follower element 94, under the action of the compression spring 90, follows the movement of the pneumatic ring piston element 22 to the left. During engagement of the pneumatic ring piston element 22, the ring piston element 22 presses via the carrier 96 against the input element 98 and takes the input element 98 along on its movement to the right. The input element 98 and the pneumatic ring piston element 22 are thus linked to each other in terms of movement for movement in the axial direction. The axial movement of the pneumatic ring piston element 22 is therefore converted into a volume enlargement or volume reduction of the cylinder space of the hydraulic measurement cylinder 82. As a result, the axial position of the pneumatic ring piston element 22 (and thus of the clutch release bearing arrangement 32) is fed back to the control valve 42. The hydraulic pressure in the hydraulic chamber 76 therefore depends, on the one hand, on the hydraulic medium volume displaced by the activation of the clutch pedal 62 in the control signal transmitter unit 60, and, on the other hand, on the hydraulic oil volume accommodated in the cylinder space of the hydraulic measurement cylinder 82, and thus on the axial position of the clutch release bearing arrangement 32. The control valve 42 is embodied so that it is possible, by suitable airing and de-airing of the ring cylinder space of the pneumatic ring cylinder 16, to maintain an approximately constant hydraulic medium pressure in the hydraulic chamber 76 at all times during clutch operation. In respect to the function of the control valve, supplemental reference is made to U.S. patent application Ser. No. 08/873,041, which is incorporated herein by reference.

Because of the pressure oil contained in the cylinder space of the hydraulic measurement cylinder 82 and because of the aforementioned compression spring 90, the input element 98 exercises, via the follower element 94, a force in the axial direction toward the clutch on the carrier 96 and thus on the pneumatic ring piston element 22. Because the input element 98 acts via the carrier 96 on only one side of the clutch axis A, i.e., extra-centrically, on the pneumatic ring piston element, a tilting moment occurs in the operating cylinder unit 14, namely, a tilting moment that acts on the pneumatic ring piston element 22 and attempts to tip the pneumatic ring piston element 22, relative to the body part 20, out of its position coaxial to the clutch axis A. This tilting moment, or a lateral force corresponding to the tilting moment, is without significance according to the invention, however, especially with respect to the danger of self-locking of the pneumatic power cylinder arrangement 14, because the application radius (effective lever length) determinant of the tilting moment is relatively small, relative to the clutch axis, in particular, smaller than in a solution as in FIG. 2 (application radius $R'_A$ shown in dashed lines in FIG. 1). According to FIG. 2, the carrier 96' extends into the movement area of the piston rod 88', which under the action of the compression spring in the cylinder space of the hydraulic measurement cylinder is prestressed with its free end against the carrier 96'. Because the tilting moment exercised on the pneumatic ring piston element by the input element is, with respect to the body part, directly proportional to the application radius (moment M=application radius R×force components in axial direction), a clearly larger tilting moment occurs in the case of FIG. 2 due to the forces exercised by the input element than in the case of FIG. 1.

Before further examples of an operating device according to the invention are explained, the following remarks should be made concerning the principle of the operating device in FIG. 1 and, generally, the principle of positioning the clutch release bearing arrangement using an operating device according to the invention, whereby reference will be made to FIG. 3. Along with the actual power cylinder arrangement 14, the operating device comprises the aforementioned control valve 42, which activates, via a connection distance y (adjustment variable Y), the power cylinder arrangement 14 in dependence on a control variable. The control variable is derived from a control signal W, which in the example shown is fed by the clutch pedal 62 via a connection distance w to the control valve 42. Relative to the example in FIG. 1, generally speaking, converter means 100 could be assigned to the signal port 54 of the control valve 42 to convert the control signal W into the control variable.

The power cylinder arrangement 14 is controlled in dependence on the control variable, which represents the target position of the clutch release bearing arrangement, and on a current value, which represents the current position of the clutch release bearing arrangement. The current value is derived from a current value signal X, which is fed via a connection distance x to the control valve 42 by an input element arrangement 82, 98 associated with the clutch release bearing arrangement. Relative to the example in FIG. 1, generally speaking, converter means 104, which serve to convert the current value signal X into the current variable, could also be associated with the signal port 102 of the control valve 42.

The control valve 42, the power cylinder arrangement 14, the input element arrangement 82, 98 (comprising, here, the hydraulic measurement cylinder 82 and the transmitter element 98) associated with the clutch release bearing arrangement, and the distances x, y constitute a control circuit, which controls the position of the clutch release bearing arrangement in keeping with the instructions of the control signal W. In the example shown, control is exercised by switching the control valve 42 between three valve states, namely, a filling control state I, in which the pressure medium source (here, a pneumatic source) is connected via the valve ports 48 and 106 to the power cylinder arrangement 14; an emptying control state II, in which the power cylinder arrangement 14 is connected via the valve ports 106 and 108 to a compensation volume (particularly, the atmosphere); and a holding control state III, in which the pressure medium cannot escape from the power cylinder arrangement 14 via the control valve 42. It should be noted that a separate holding control state of the control valve is not absolutely necessary. If the control valve has no holding state of its own, such a state can be realized by continual switching between the filling connection 48-106 and the emptying connection 106-108. If the control valve has its own control state, this state can also be realized by continual switching between the filling connection 48-106 and the emptying connection 106-108. Even if there is no holding control state of the control valve itself, there will nonetheless be a function called "holding" of the operating device, meaning, namely, that in certain operating states there is continual switching of the control valve between the filling control state I and the emptying control state II.

Relative to the example in FIG. 1, generally speaking, both the control signal W indicating the target position and the feedback or current value signal X could be realized independent of one another by any suitable type of signal. The signals may be hydraulic, pneumatic, mechanical, electrical or optical signals, to mention the most important types of signal. According to the type of signal, the particular signal can be represented by a pressure, a volume, a force, a distance, an angle, a flow, a voltage or a light intensity, again to mention only the most important physical signal representations. What is important is that the control signal W and the current value signal X can be different types of signal, and that the control signal W and the current value signal X can be represented by different physical variables. If the control signal W and the current value signal X are of different types or are represented by different physical variables, then, by means of the aforementioned conversion means 100 and 104, a conversion of the signals to variables of the same type (control variable or current variable) can be carried out. With respect to the current value signal X, it should be noted that the particular planned signal type is independent of the input element arrangement provided to pickup the axial position of the clutch release bearing arrangement. Thus, an input element arrangement that exercises not inconsiderable forces on the clutch release bearing arrangement or the ring piston element, for example, an input element arrangement with a hydraulic measurement cylinder as in the example in FIG. 1 or a purely mechanical input element arrangement, can be equipped with conversion means, which produce a non-hydraulic or a non-mechanical signal that is supplied to the control valve.

From the current variable and the control variable, a differential variable can be derived, which determines the control state of the control valve 42. In the example shown, the control valve assumes the filling control state I when the control variable is larger than the current variable, and assumes the emptying control state II when the control variable is smaller than the current variable. If the control variable is the same as the current variable, the control valve 42 in the example in FIG. 3a assumes the holding control state III.

Relative to the example in FIG. 1, generally speaking, the current variable, the control variable and, in some cases, the differential variable can each be a hydraulic, pneumatic, mechanical or electric variable, in particular, a pressure, a volume, a force, a distance, an angle, a flow or a voltage, or even just a calculated variable, which preferably exists with suitable digitalization in the storage areas of an electronic control device, particularly a microprocessor, of the control valve.

In practice, it is often advantageous for no linear connection to exist between the control signal W and the axial position of the clutch release bearing arrangement established under the control or regulation of the control valve 42. For example, for sensitive manual engagement by suitable operation of the clutch pedal 62, it is advantageous when, to a central target position area of the clutch, which is limited by a position of initial torque transmission s and an engaged position EK for substantially maximum torque transmission, there is spreading in the associated control signals W relative to the other target position areas. A corresponding position curve, which assigns to each control signal W a target axial position W', is shown in FIG. 3b.

Figure 4:
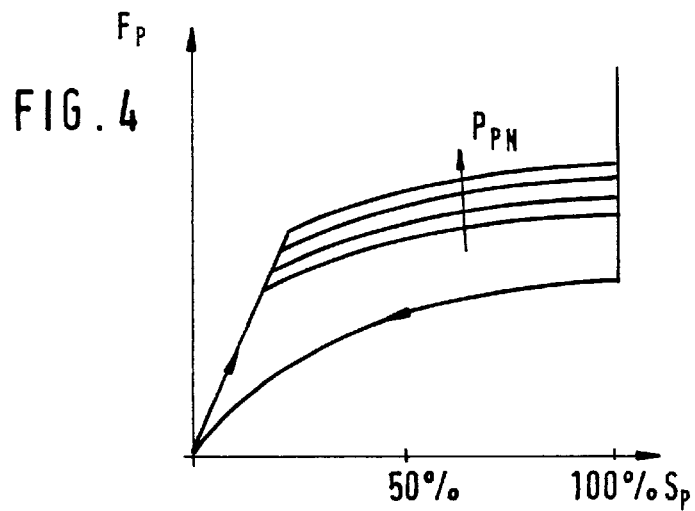
FIG. 4 shows, for an operating device with clutch operation via a pedal arrangement as in the examples in FIGS. 1 and 3, a diagram of the ideal connection between the pedal travel $S_P$ and the pedal force $F_P$ for different pneumatic pressures $P_{PN}$ as the parameters.

Again making reference to the example in FIG. 1: during operation of the clutch pedal 62, a hydraulic pressure is built up in the hydraulic chamber 76 and thus, at the same time, in the cylinder space of the hydraulic measurement cylinder 82, which hydraulic pressure acts, via the input element 98, on the clutch release bearing arrangement 32 of the power cylinder arrangement 14 with an axially directed measurement cylinder force $F_{MZ}$ and produces a lateral force or a tilting moment acting on the ring piston element 22. When the pedal 62 is released, the pressure in the hydraulic chamber 76 and thus the pressure acting in the cylinder space 80 of the hydraulic measurement cylinder 82 are reduced. The remaining residual pressure also acts via the input element 98 on the clutch release bearing arrangement 32 on the ring piston element 22 of the power cylinder arrangement 14. The measurement cylinder force $F_{MZ}$, and thus the lateral force or the tilting moment, are not constant over the pedal travel $S_p$, but are instead generally dependent on variables such as the pedal speed, positioning device curve and given operating pressure medium pressure (here, operating pneumatic pressure $P_{PN}$) of the pressure medium source (pneumatic source) 51, whereby, furthermore, different measurement cylinder forces $F_{MZ}$ result during the operation of the pedal (disengagement) and the release of the pedal (engagement), as shown in the idealized representation reflecting quasi-stationary clutch operation in FIG. 5. Because of the embodiment of the control valve 42, the measurement cylinder force $F_{MZ}$ depends on the pneumatic pressure $P_{PN}$ only in the operating phase of the pedal (upper branch, measurement cylinder force $F_{MZ}$ increases with pneumatic pressure $P_{PN}$). For the sake of completeness, FIG. 4 also shows how the relationship between the pedal travel $S_P$ and the pedal force $F_P$ could look in idealized fashion. As in FIG. 5, the upper branch corresponds to the operating phase of the pedal, which depends on the pneumatic pressure $P_{PN}$ and moves with increasing pneumatic pressures to greater clutch pedal forces $F_P$.

Figure 6:
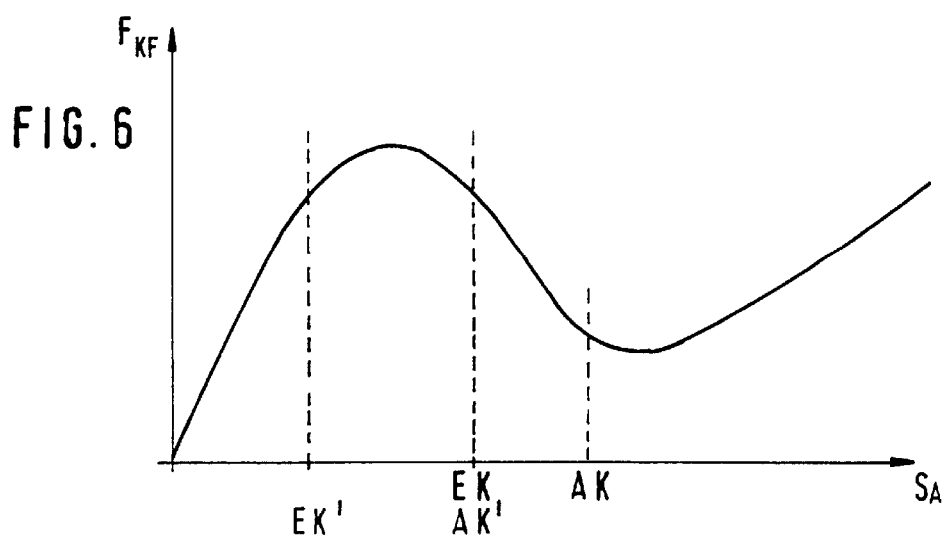
FIG. 6 shows a diagram of a possible relationship, depending on the design of the clutch, between the clutch release bearing travel $S_A$ and the clutch spring force $F_{KF}$ exercised by the clutch spring or springs on the clutch release bearing arrangement.

The pneumatic pressure established in the pneumatic power cylinder arrangement 14, i.e., in the cylinder space of the pneumatic ring cylinder 16, depends in the stationary or quasi-stationary state (particularly in the holding control state III of the control valve) on the force exercised by the clutch on the clutch release bearing arrangement 32, i.e., on the force exercised via the clutch spring (diaphragm spring) on the clutch release bearing arrangement (in the stationary or quasi-stationary state, the pressure forces of the pneumatic medium in the cylinder space of the pneumatic ring cylinder 16 and the force exercised via the diaphragm spring on the clutch release bearing arrangement 32 are in equilibrium). FIG. 6 shows an example of the relationship between the clutch spring force $F_{KF}$ exercised by the diaphragm spring on the clutch release bearing arrangement and the clutch release bearing travel $S_A$, whereby not only the spring force of the diaphragm spring, but also the spring forces of other springs of the clutch (tangential leaf springs, lining springs, etc.), contribute to the clutch spring force $F_{KF}$. A possible working area would be, for example, the area lying between EK (engaged position) and AK (disengaged position) of the clutch release bearing travel $S_A$, or, alternatively, the area of the clutch release bearing travel $S_A$ lying between EK' (engaged position) and AK' (disengaged position).

Figure 7:
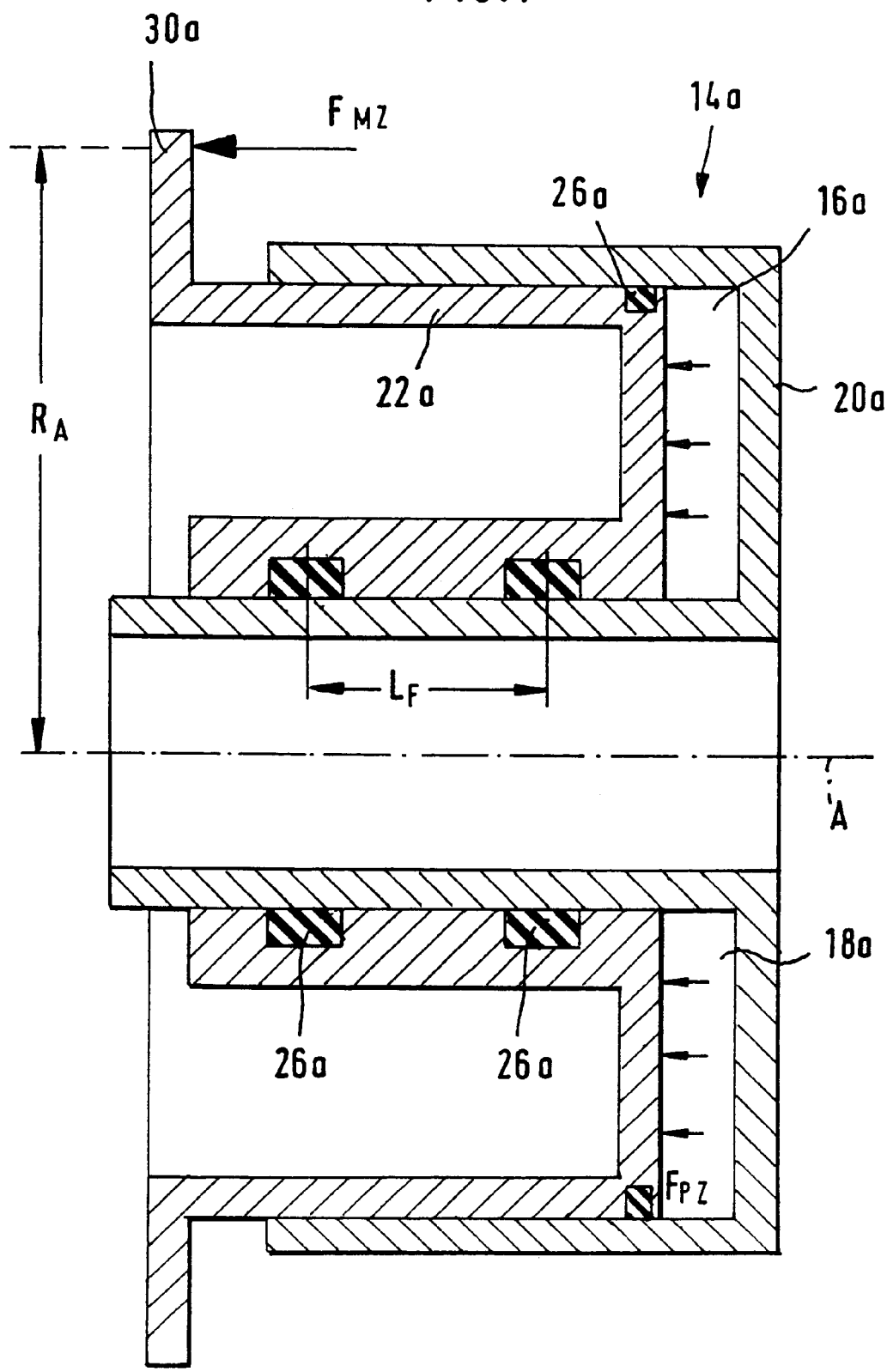
FIG. 7 shows, schematically, a section through a pressure medium power cylinder arrangement with a pressure medium ring cylinder, especially a pneumatic ring cylinder, to illustrate influence variables that are important with respect to self-locking of the pressure medium power cylinder arrangement due to lateral forces.

The extent to which tilting moments acting in the pressure medium power cylinder arrangement (here, on the pneumatic ring piston element 22) can be dangerous with respect to the risk of self-locking of the power cylinder arrangement depends on several influence variables. The most important of these influence variables are the force resulting from the pickup of the current variable and acting on the pressure medium power cylinder arrangement, the level of friction (friction coefficient $\mu$) between the piston and the cylinder of the power cylinder arrangement, the active control length describing the control of the axially movable part of the pressure medium power cylinder arrangement (ring piston element 22) on the stationary part of the pressure medium power cylinder arrangement (body part 20), and the application radius of the force resulting from the current value pickup, which indicates the lever length effective for the induced tilting moment. Reference is hereby made to FIG. 7, which schematically shows a section through a pneumatic ring cylinder 16a with a pneumatic ring piston element 22a. The forces exercised by the pneumatic medium on the ring piston element 22a are symbolized by the arrows $F_{PZ}$. To reduce the danger of self-locking, the force $F_{MZ}$ (measurement cylinder force) resulting from the current value pickup, the friction and the application radius $R_A$ should be as small as possible, and the available control length $L_F$ should be as large as possible. The influence variables on the force (measurement cylinder force $F_{MZ}$) resulting from the current value pickup depend on the control valve and input element arrangement used. In the case of the control valve and the measurement cylinder in FIG. 1, the measurement cylinder force $F_{MZ}$ depends on the operating pneumatic pressure $P_{PN}$, on the spring rates of the springs of the control valve, on the effective air flow-through diameter, and on the effective measurement cylinder area (diameter of measurement cylinder). To minimize the measurement cylinder force $F_{MZ}$, all of the aforementioned variables except for the air flow-through diameter should be kept as small as possible.

Figure 2:
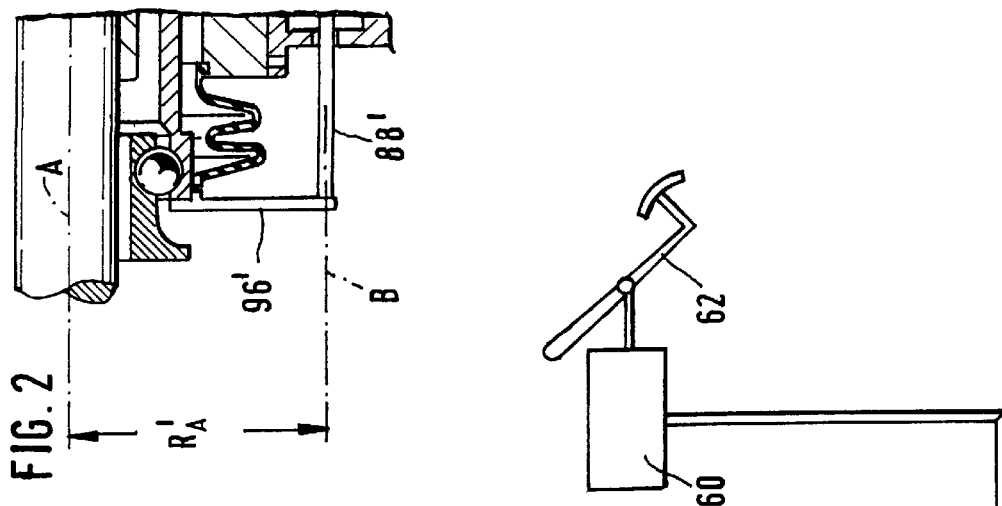
FIG. 2 shows how the operating device can be embodied without application radius reduction means.

In the embodiments described below, for elements that work in the same or analogous manner, the same reference numbers are used as in the embodiments in FIGS. 1 and 2, but supplemented with lower case letters to identify the particular example (the same is true for the pneumatic ring cylinder in FIG. 7), whereby reference is hereby made explicitly to the particular previously described embodiments, and only the differences relative thereto are explained.

Figure 8:
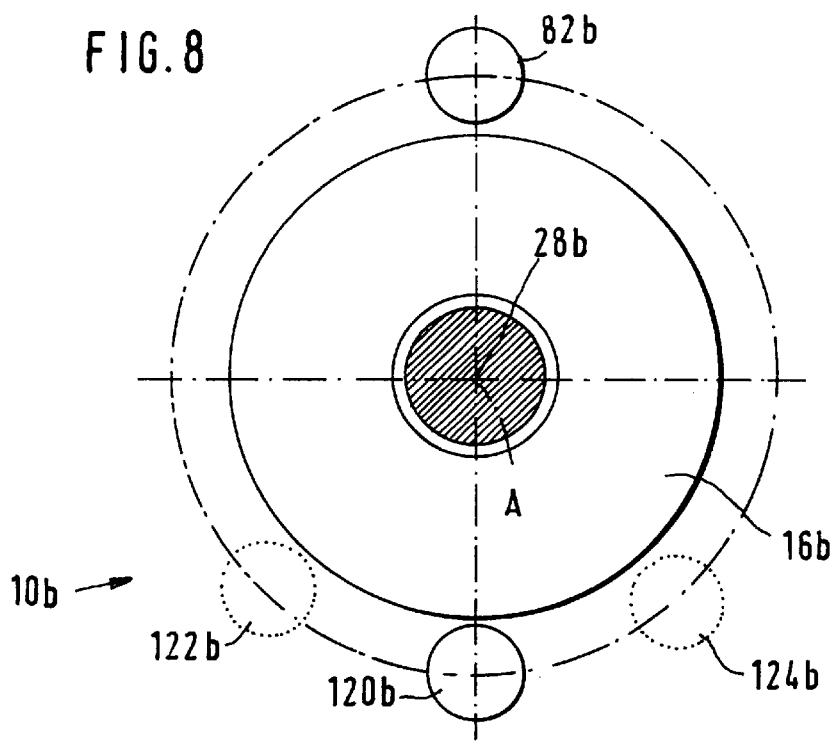
FIG. 8 and FIG. 9 show, in schematic side views with a sectional plane orthogonal to the clutch axis, two examples of an operating device according to the invention with a pressure medium ring cylinder, especially a pneumatic ring cylinder, and at least one pressure medium auxiliary cylinder, especially a pneumatic auxiliary cylinder, which serve to compensate for a tilting moment produced by a hydraulic measurement cylinder arrangement.

The embodiment in FIG. 8 shows, schematically, a pneumatic ring cylinder 16b as the main power cylinder, and a hydraulic measurement cylinder 82b of an operating device 10b according to the invention, which could correspond to the corresponding components in the embodiment in FIG. 1. An input element of the hydraulic measurement cylinder is connected in terms of movement to the pneumatic ring piston element of the operating device 10b, for example, as shown in FIGS. 1 or 2. To compensate for a tilting moment induced by the hydraulic measurement cylinder 82b and acting on the ring piston element, a pneumatic auxiliary cylinder 120b is provided, which has a pneumatic piston connected in terms of movement to the pneumatic ring piston element. The pneumatic auxiliary cylinder 120b is, like the pneumatic ring cylinder 16b, attached to the same control valve of the operating device 10b, and in the pneumatic auxiliary cylinder 120b there prevails, at least in a stationary or quasi-stationary state, the same pneumatic pressure as in the pneumatic ring cylinder 16b. The pneumatic auxiliary cylinder 120b lies, relative to the clutch axis A, diametrically opposite to the hydraulic measurement cylinder 82b. The hydraulic measurement cylinder induces a tilting moment $M_{MZ}$, for which it holds that:

$$M_{MZ} = P_{HYD} \times A_{MZ} \times R_{MZ}$$

where $P_{HYD}$ is the hydraulic pressure in the measurement cylinder, $A_{MZ}$ is the effective area of the hydraulic cylinder, and $R_{MX}$ is the effective application radius (application radius $R_A$). The pneumatic auxiliary cylinder induces a counter tilting moment $M_{HZ}$, for which it holds that:

$$M_{HZ} = P_{PZ} \times A_{HZ} \times R_{HZ}$$

where $P_{PZ}$ is the pneumatic pressure in the pneumatic power ring cylinder arrangement consisting of main power cylinder and auxiliary cylinder, $A_{HZ}$ is the effective area of the auxiliary cylinder, and $R_{HZ}$ is the effective application radius (application radius $R_A$) of the auxiliary cylinder. For the force exercised by the main power cylinder 16b, the following holds:

$$F_{HZ} = P_{PZ} \times A_{HZ}$$

where $A_{HZ}$ is the effective surface of the main power cylinder 16b. The total force $F_{AUS}$ acting on the clutch release bearing arrangement directly or indirectly and moving the latter axially is equal to the sum of the force $F_{MZ} \times A_{MZ} \times P_{HYD}$ exercised by the measurement cylinder, the force $F_{HZ} = A_{HZ} \times P_{PZ}$ exercised by the auxiliary cylinder and the force $F_{HZ}$ of the main power cylinder.

Deviating from the depiction in FIG. 8, the effective cylinder surfaces A and the effective application radii R are different for the measurement cylinder 82b and the auxiliary cylinder 120b. These are, in dependence on the hydraulic pressures $P_{HYD}$ occurring during clutch operation, to be selected so that, taking into account the pneumatic pressures $P_{PZ}$ occurring during clutch operation (which depend, in the stationary or quasi-stationary state, on the force $F_{KF}$ exercised in the given clutch release position by the clutch on the clutch release bearing arrangement), optimal tilting moment compensation is attained. Optimal tilting moment compensation means, for example, that, over a clutch operating cycle, on the average, the residual tilting moment left over as the (vectorial) difference between the tilting moment $M_{MZ}$ and the counter tilting moment $M_{HZ}$ is minimal. However, optimal compensation can also mean that the counter tilting moment compensates for a tilting moment peak value that is dangerous with respect to self-locking of the pneumatic ring cylinder, without attaining a minimal residual tilting moment, on the average, throughout the operating cylinder.

The counter tilting moment $M_{HZ}$ can also be produced by several pneumatic auxiliary cylinders, each of which supplies a counter tilting moment contribution. The total produced counter tilting moment $M_{HZ}$ is the vectorial sum of the individual counter tilting moment contributions. FIG. 8 shows, in dashed lines, two additional pneumatic auxiliary cylinders 122b and 124b as in a variant embodiment. Generally speaking, according to the solution shown in FIG. 8, one or more pneumatic auxiliary cylinders are thus arranged distributed on the circumference of the pneumatic ring cylinder 16b serving as the main power cylinder, and are designed and distributed so that the lateral force caused by the measurement cylinder 82b or the tilting moment induced by the measurement cylinder is approximately neutralized, and the resultant force of the measurement cylinder and the auxiliary cylinder or the auxiliary cylinders thus lies approximately coaxial to the clutch axis.

Figure 9:
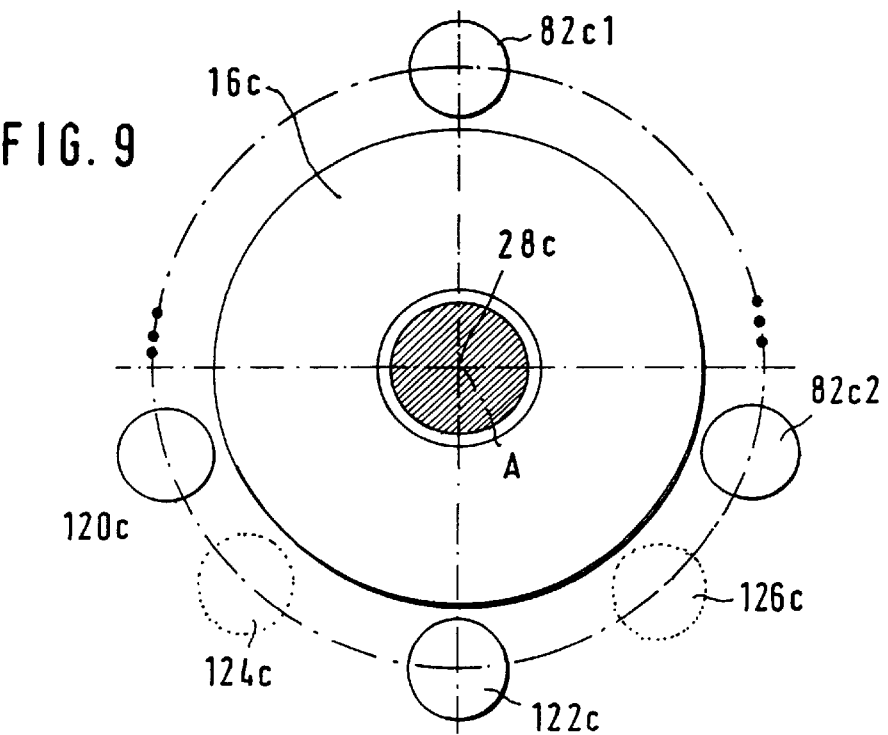

What was said about FIG. 8 is also true in the case of embodiment in FIG. 9, having several hydraulic measurement cylinders 82c1 and 82c2. The pneumatic auxiliary cylinders 120c and 122cor, alternatively, 120c, 122c, 124c and 126c are distributed around the circumference of the main power cylinder 16c and designed so that the total tilting moment produced by the two hydraulic measurement cylinders 82c1 and 82c2 is optimally compensated for, so that the resultant force lies approximately coaxial to the clutch axis.

Figure 10:
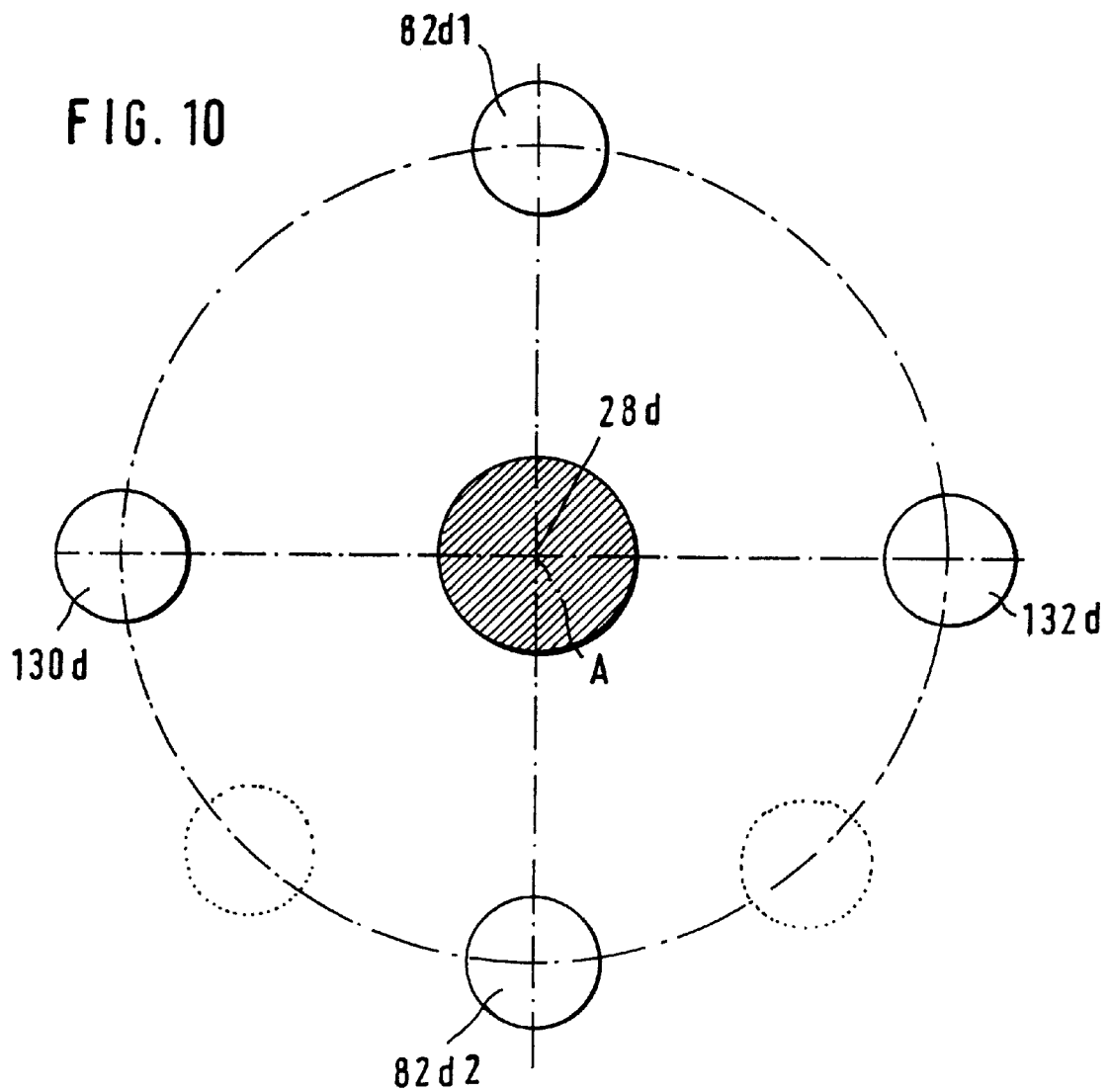
FIG. 10 shows an example of an operating device according to the invention with a hydraulic measurement cylinder arrangement, which in the ideal case produces no tilting moment.

Ideal compensation for or avoidance of tilting moments can be achieved by having at least two identical hydraulic measurement cylinders lie in pairs, relative to the clutch axis, diametrically opposite to each other with the same application radius, as shown in FIG. 10 in the case of the hydraulic measurement cylinders 82d1 and 82d2. In the embodiment in FIG. 10, instead of a pneumatic ring cylinder, two identical pneumatic cylinders 130d and 132d that lie diametrically opposite to each other, relative to the clutch axis, are provided as the main power cylinder. It is also possible to provide even more pneumatic cylinders and/or hydraulic measurement cylinders, as indicated by two cylinders shown in dashed lines, as long as the cylinders are designed and distributed in such a way that the lateral forces or tilting moments caused by the cylinders are approximately or completely neutralized, and the resultant force thus lies approximately or completely coaxial to the clutch axis. The force $F_{AUS}$ acting on the clutch release bearing arrangement and moving it axially is equal to the sum of the force $F_{MZ}$ exercised by the measurement cylinders and the force $F_{HZ}$ exercised by the pneumatic cylinders.

Figure 11:
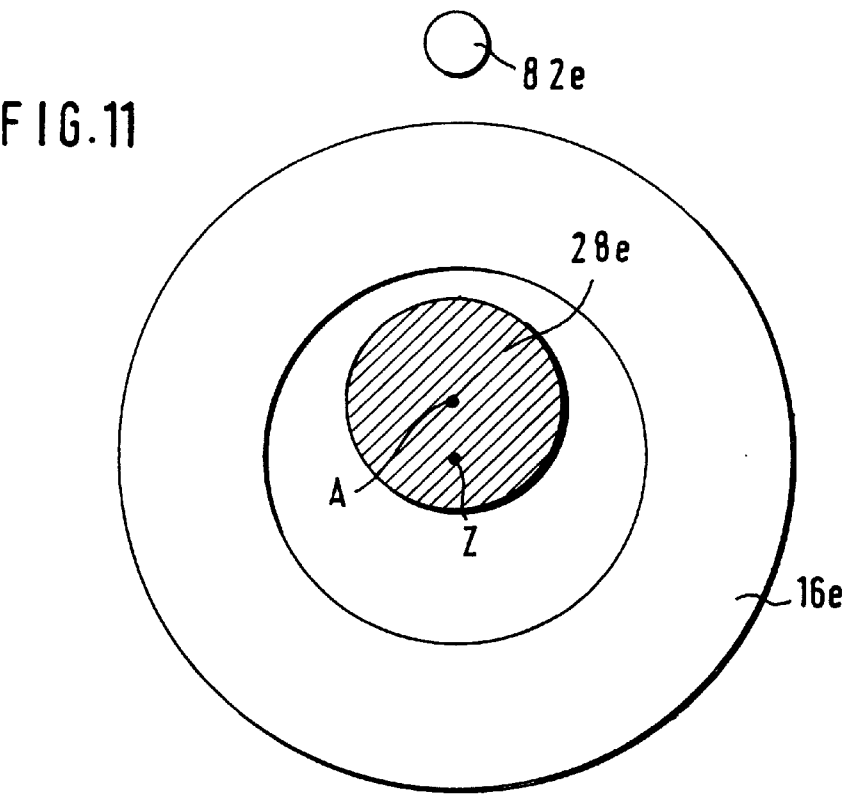
FIG. 11 and FIG. 12 show, in views corresponding to FIG. 8, two further embodiments of an operating device according to the invention, in which the pressure medium ring cylinder, especially a pneumatic ring cylinder, is embodied and arranged so as to compensate for a tilting moment produced by a hydraulic measurement cylinder arrangement.

In the event that a pressure medium ring cylinder, especially a pneumatic ring cylinder, is used, compensation for a tilting moment induced by a hydraulic measurement cylinder or, generally, by a measurement input element arrangement, can also be achieved by arranging or embodying the ring cylinder eccentric relative to the clutch axis A. In the embodiment in FIG. 11, the ring cylinder 16e, which is embodied concentric to a ring cylinder axis Z, is arranged with the cylinder axis Z offset relative to the clutch axis A; specifically, in such a way that the tilting moment induced by the hydraulic measurement cylinder 82e is optimally compensated for by a corresponding counter tilting moment caused by the ring cylinder 16c itself. For this purpose, the ring cylinder axis Z lies diametrically opposite to the hydraulic measurement cylinder 82e, relative to the clutch axis A, whereby the width of the offset between the clutch axis A and the ring cylinder axis Z depends on the occurring hydraulic and pneumatic pressures and on the geometry and design of the ring cylinder.

Figure 12:
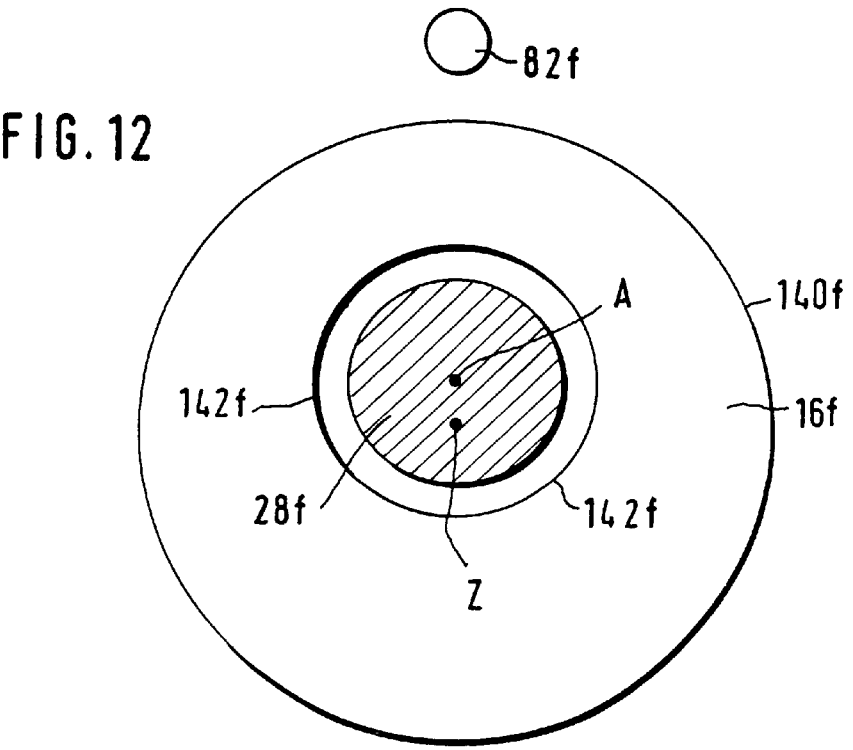

Another possibility is to embody the pressure medium ring cylinder, especially the pneumatic ring cylinder, eccentrically itself, as shown in FIG. 12 in the case of the pneumatic ring cylinder 16f. The pneumatic ring cylinder 16f has a radially outer ring cylinder wall 140f, which is concentric to a ring cylinder axis Z, as well as a radially inner ring cylinder wall 142f, which is eccentric to the outer ring cylinder wall 140f and concentric to the clutch axis A in the example shown. The ring cylinder axis Z lies, as in the example in FIG. 11, diametrically opposite to the hydraulic measurement cylinder 82f, relative to the clutch axis A, whereby the offset between the clutch axis A and the ring cylinder axis Z depends on the occurring pressures and designs. In both embodiments (FIG. 11 and FIG. 12), according to the invention, the resultant force from the forces of the hydraulic measurement cylinder and the pneumatic ring cylinder lies approximately on the clutch axis and no substantial resulting tilting moment occurs.

Figure 13A:
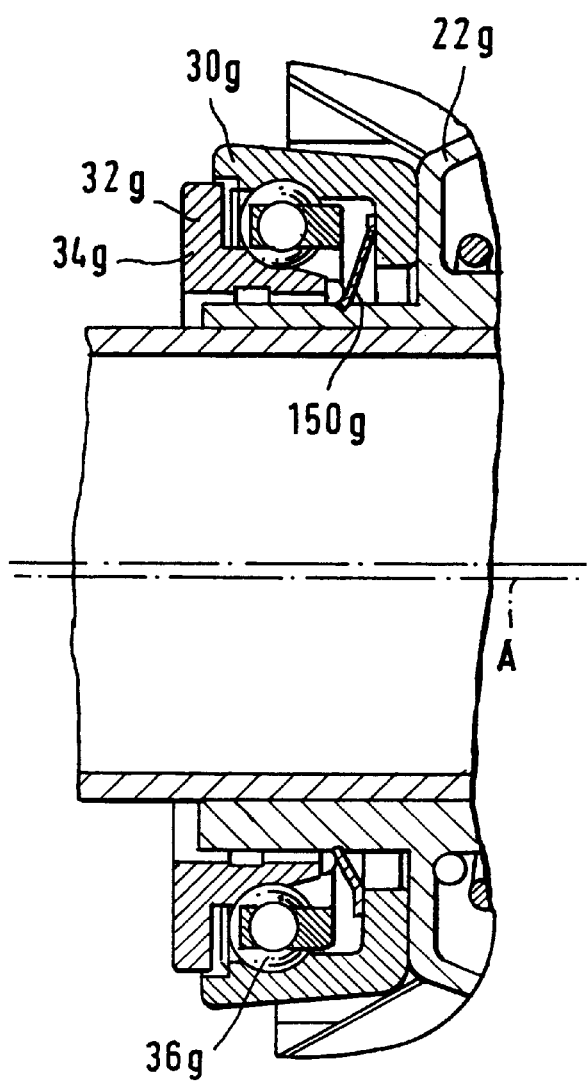
FIG. 13 shows, in FIGS. 13a and 13b, two embodiments of how the attachment of the clutch release bearing to a pressure medium ring cylinder embodied and arranged as in FIG. 11 or FIG. 12 could be carried out.
Figure 13B:
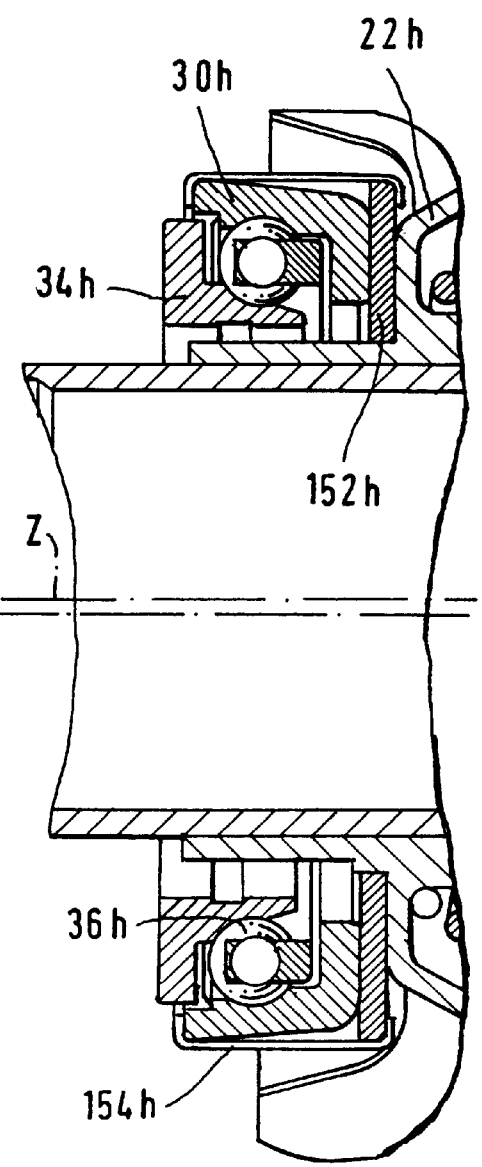

Two possible ways in which the clutch release bearing arrangement can be attached to the eccentrically arranged or embodied ring cylinder (main cylinder) are shown in FIG. 13. FIGS. 13a and 13b, respectively, show what is called a self-centering bearing. In the embodiment in FIG. 13a, the clutch release bearing arrangement 32g comprises an outer ring 30g that does not rotate with the clutch and relative to which the disengaging ring 34g, also known as the inner ring, can be turned by means of a ball bearing 36g. The outer ring 30g is pressed by a plate spring 150g onto a section of the ring piston element 22g, whereby the pressure force is selected so that at the beginning of clutch operation, self-centering is possible in the event of eccentricity of the clutch release bearing relative to the clutch axis.

In the embodiment in FIG. 13b, the clutch release bearing arrangement is attached to the ring piston element 22h by means of a ring disk 152h, which is located on the ring piston element 22h and to which the outer ring 30h is attached by means of a spring brace 154h. Between the outer ring 30h and the spring brace 154h, a wave-type spring not visible in the drawing is provided. As in the embodiment in FIG. 13a, the outer ring 30h is clamped in a defined manner, so that, to an extent, by the deliberate use of friction forces between the outer ring and the ring piston element or the ring disk, a self-centering is possible (in the embodiment in FIG. 13b, with slight elastic deformation of the spring brace 154h).

In the embodiments in FIGS. 8 to 11, the counter tilting moments that counteract the tilting moment of the measurement input element arrangement, especially of the hydraulic measurement cylinder, due to its measurement cylinder force $F_{MZ}$, were applied by at least one pneumatic auxiliary cylinder, by the pneumatic main cylinder itself or by the input element arrangement itself (an additional measurement cylinder in the embodiment in FIG. 10). Lateral force compensation or tilting moment compensation, however, can also be achieved by the use of one or more elastic components/energy storage devices, which are referred to here generally as the compensation spring arrangement. The compensation spring, for example, can be realized by simple compression and/or tension springs. However, the use of other elastic elements (energy storage devices) is also conceivable.

Figure 14:
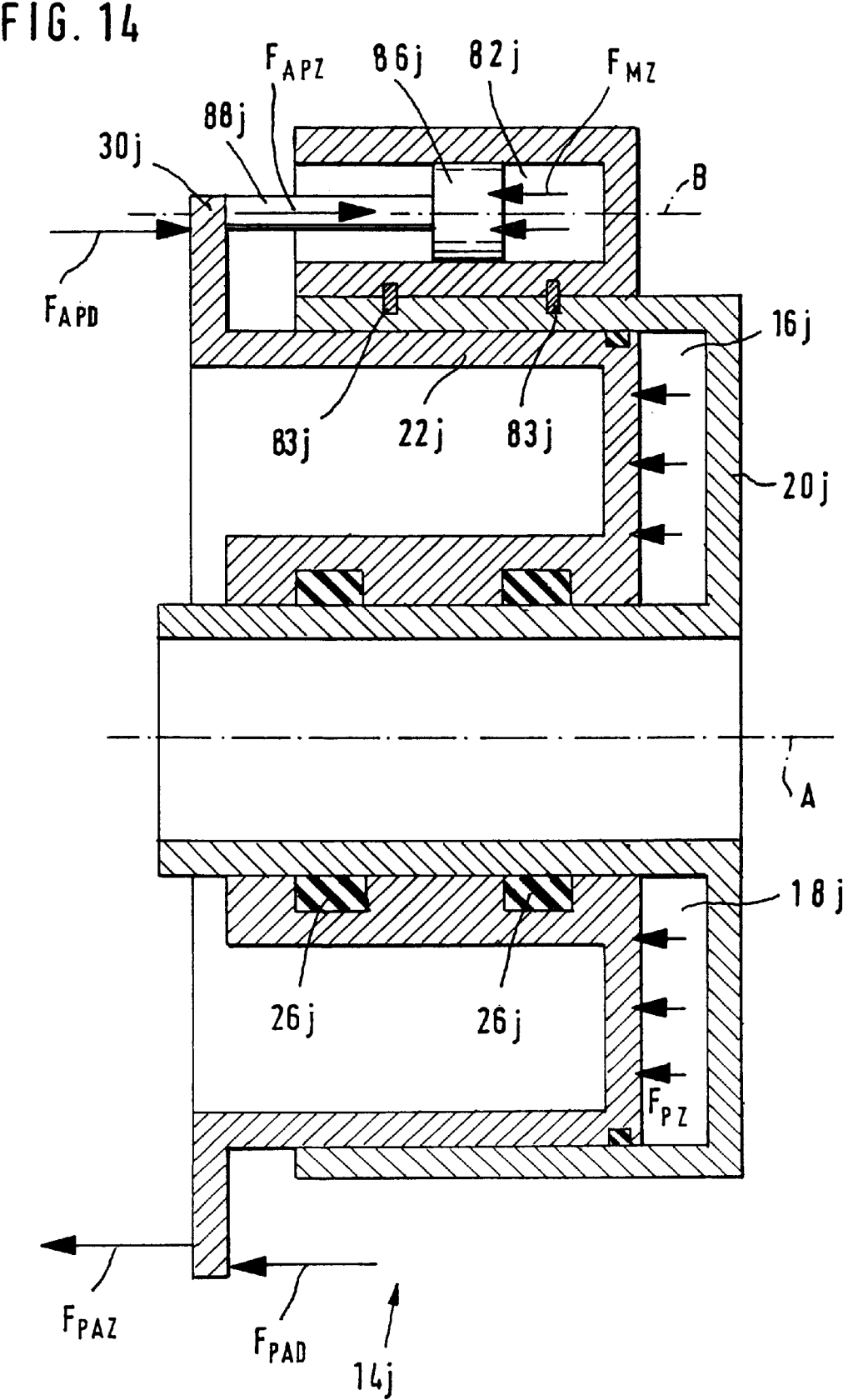
FIG. 14 shows, schematically, a section through a pressure medium power cylinder arrangement comprising a pressure medium ring cylinder with a laterally attached hydraulic measurement cylinder. In this drawing, the forces of the pressure medium, especially the pneumatic medium, as well as the forces of the hydraulic medium in the measurement cylinder acting directly or indirectly on the pressure medium power cylinder arrangement, are indicated by arrows. Further, by means of other arrows, compensation forces are indicated, which can serve according to one embodiment of the invention to compensate for a tilting moment caused by the measurement cylinder.
Figure 15D:
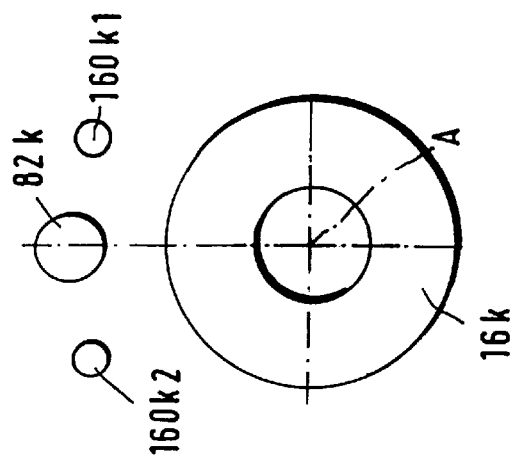
Figure 15C:
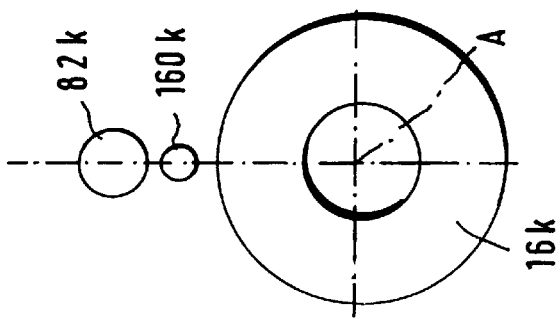
Figure 15B:
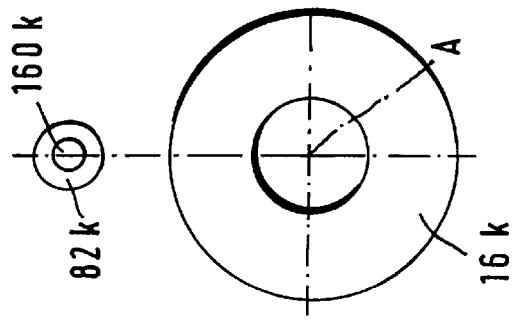
Figure 15A:
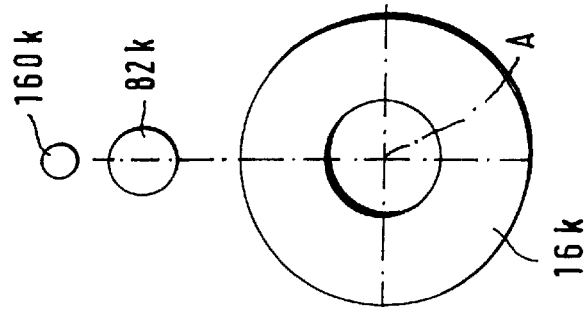
Figure 16D:
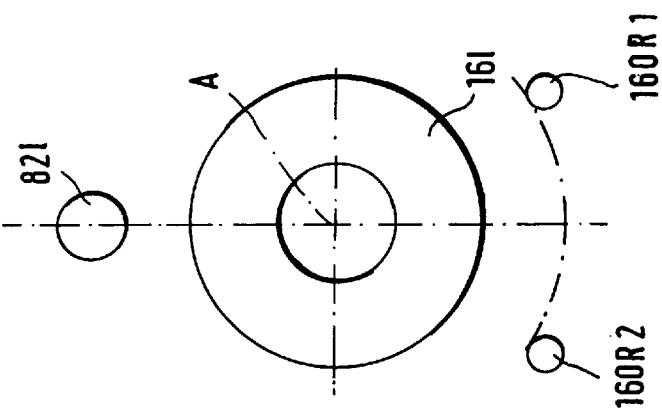
Figure 16C:
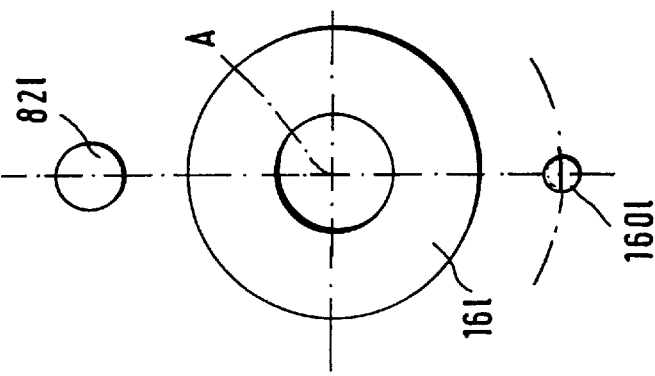
Figure 16B:
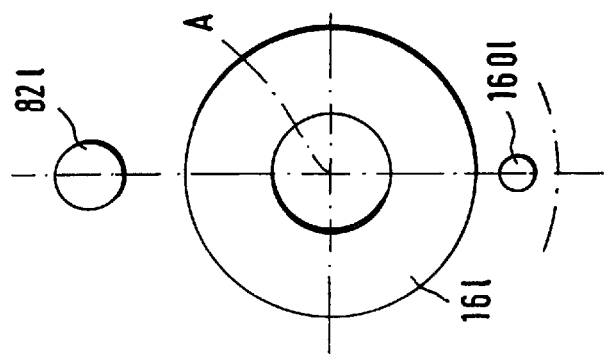
Figure 16A:
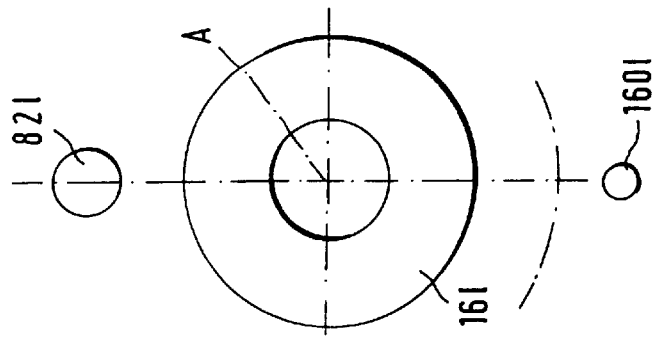

FIG. 14 shows embodiments of the manner in which the compensation spring arrangement can act on the axially movable part (especially the pneumatic ring piston element) of the pressure medium power cylinder arrangement. The arrangement in FIG. 14 corresponds to the arrangement in FIG. 7, whereby, in addition, a hydraulic measurement cylinder 82*j* with a piston 86*j* and a piston rod 88*j* are shown schematically. The measurement cylinder 82*j* is attached by means of symbolically depicted attachment elements 83*j* to the body part 20*j*. The piston rod 88*j* acts on a ring section 30*j*, so that, due to the pressure of the hydraulic medium in the hydraulic measurement cylinder 82, a force $F_{MZ}$ is transmitted extra-centrically relative to the clutch axis A to the ring piston element 22*j*, and thus a tilting moment to be compensated for is induced. Compensation can be carried out, on the one hand, by a corresponding oppositely-directed (anti-parallel) force component, which acts, for example, in the application area of the piston rod 88*j* on the ring section 30*j* on the latter. This can be attained, for example, by a compression spring (force $F_{APD}$) and/or tension spring (force $F_{APZ}$ of the compensation spring. Alternatively or in addition to this, it is also possible to employ a compensation force component that lies, relative to the clutch axis A, roughly diametrically opposite to the application area of the piston rod 88*j* on the ring section 30*j* and acts on the ring section 30*j*, which force component is directed in the same direction as the measurement cylinder force $F_{MZ}$, i.e., is parallel thereto. For example, this compensation force can be attained by a tension spring (force $F_{PAZ}$) and/or a compression spring (force $F_{PAD}$) of the compensation spring arrangement. The aforementioned forces are symbolized in FIG. 14 by arrows.

On the measurement-cylinder side of the pressure medium power cylinder arrangement and/or on the side opposite to the measurement cylinder of the pressure medium power cylinder arrangement, one or more springs can be provided. In the case of multiple springs, their resultant force should lie on a plane fixed by the clutch axis A and the measurement cylinder force $F_{MZ}$ (parallel to the clutch axis A). Optimal compensation is attained when the resultant force from the measurement cylinder force $F_{MZ}$ and the compensation forces lies substantially on the clutch axis A.

Different ways of positioning one or more compensation springs 160*k* in relation to the hydraulic measurement cylinder 82*k*, the main cylinder (pneumatic ring cylinder) 16*k* and the clutch axis A are illustrated in FIGS. 15, 16 and 17. Thus, one or more compensation springs 160*k*, relative to the clutch axis A, can be arranged radially outside (FIG. 15*a*) or radially inside (FIG. 15*b*), inside the measurement cylinder itself (FIG. 15*c*) and lateral and symmetrical to the measurement cylinder (15*d*). Further, one or more compensation springs 160*l* can be arranged on the side of the pressure medium power cylinder arrangement, especially the pneumatic ring cylinder 16*l*, opposite to the hydraulic measurement cylinder 82*l*, on spring positions (cf. FIG. 16) symmetrical to the spring positions in FIG. 15. As FIG. 17 shows, one or more compensation springs 160*m* or 160*n* can also be arranged in the ring cylinder 16*m* or 16*n* itself. As explained in reference to FIG. 14, the compression springs (FIG. 15 and FIG. 17*a, b*) arranged on the measurement-cylinder side of the pneumatic ring cylinder produce a compensation force with force components anti-parallel to the measurement cylinder force, in contrast to which the compensation springs (FIG. 16 and FIG. 17*c-d*) arranged on the side of the pneumatic ring cylinder opposite to the measurement cylinder produce a compensation force with force components parallel to the measurement cylinder force.

Below, several examples of compensation spring arrangements according to the invention are explained in greater detail in reference to FIGS. 18 to 24. The aforementioned drawings start from the embodiment in FIG. 14 and show only the components added or changed relative to that embodiment.

Figure 18A:
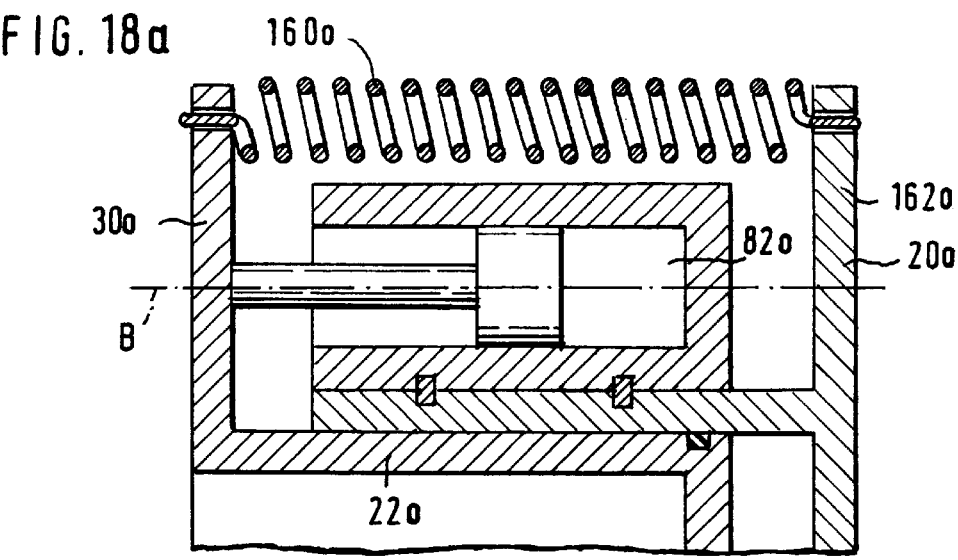
FIGS. 18a–c, 19a-b, 20a-b and 21, show the arrangement as in FIG. 14 with different embodiments of an anti-parallel force spring arrangement of a compensation spring arrangement, which counteracts a tilting moment produced by the measurement cylinder.
Figure 25A:
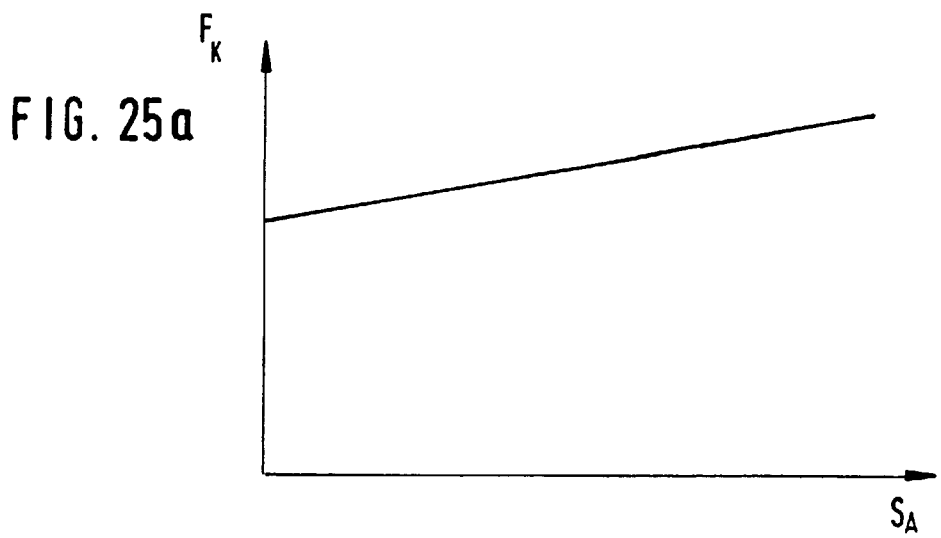
FIG. 25a shows, a spring characteristic of an anti-parallel force spring arrangement comprising, for example, a single compression spring or a single tension spring.

In the example in FIG. 18*a*, a tension spring 160*o* active between the ring piston element 22*o* and the body part 20*o* is provided, which is arranged radially outside of the hydraulic measurement cylinder 82*o* and acts on an extension of the ring section 30*o* and an attachment section 162*o* of the body part 20*o*. The tension spring 160*o* is preloaded in the engaged state (maximum shifting of the ring piston element 22*o* to the right), resulting in a spring characteristic (compensation spring force $F_K$ as function of the clutch release bearing travel $S_A$) as shown in FIG. 25*a*. The result is that the compensation spring, even in the engaged state without clutch operation, exercises a not insubstantial force on the ring piston element 22*o*, which is disadvantageous when the hydraulic measurement, in the engaged state, exercises no force or only a substantially reduced force on the ring piston element 22 and, accordingly, a relatively large tilting moment induced by the compensation spring 160*o* remains.

Figure 25B:
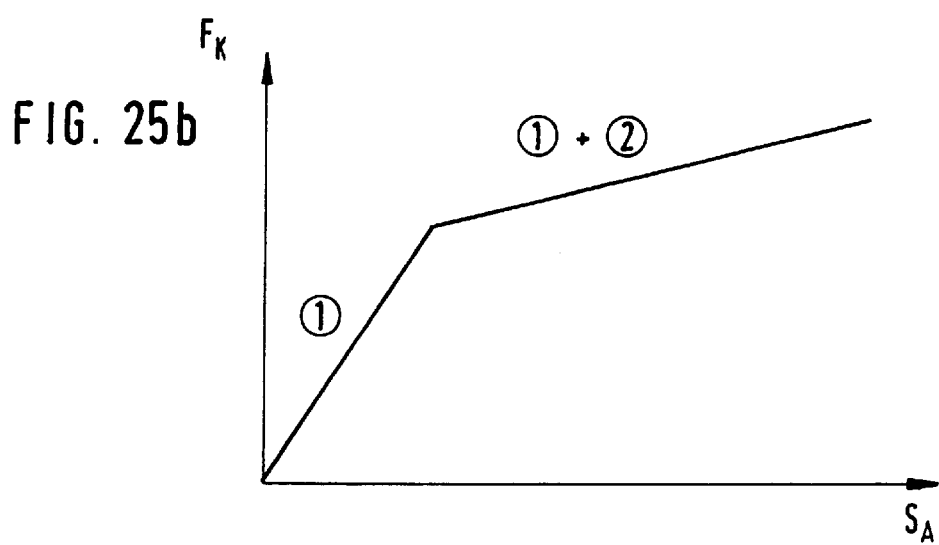
FIG. 25b shows the spring characteristic of an anti-parallel force spring arrangement comprising, for example, a serial connection of a hard, non-preloaded and a soft, preloaded compression or tension spring.

This problem can be solved as follows. Instead of the tension spring 160*o*, there is a serial connection of two tension springs 160*p*1 and 160*p*2, of which in the engaged state only the harder tension spring 160*p*2, but not the softer tension spring 160*p*1, is preloaded. In addition, between the two tension springs there is a stop plate 164*p*, which in the engaged state lies on a ring section 166*p* on the hydraulic measurement cylinder 82*p* and, upon disengagement of the ring piston element 30*p*, is not lifted from the ring section 160*p* until the spring force of the tension spring 160*p1* has reached the preload force of the tension spring 160*p*2. The total resulting spring characteristic is shown in FIG. 25*b*. In a first branch 1 of the spring characteristic, only the tension spring 160*p*1 is active. As soon as the stop plate 164*p* is lifted from the ring section 166*p*, the second tension spring 160*p*2 also becomes active and is, during further disengagement, like the tension spring 160*p*1, increasingly tensed, so that the characteristic section marked 1+2 in FIG. 25*b* results. As this spring characteristic indicates, the non-preloaded tension spring 160*p*1 is a clearly harder spring than the preloaded tension spring 160*p*2. Thus, in the engaged state of the ring piston element, only a much lesser force is exercised by the tension spring 160*p*1 on the ring piston element than in the case of FIG. 18*a*. So that this force does not increase excessively in the engaged state at the result of increasing clutch wear, it is advantageous to provide a wear compensation device for the clutch.

Figure 18B:
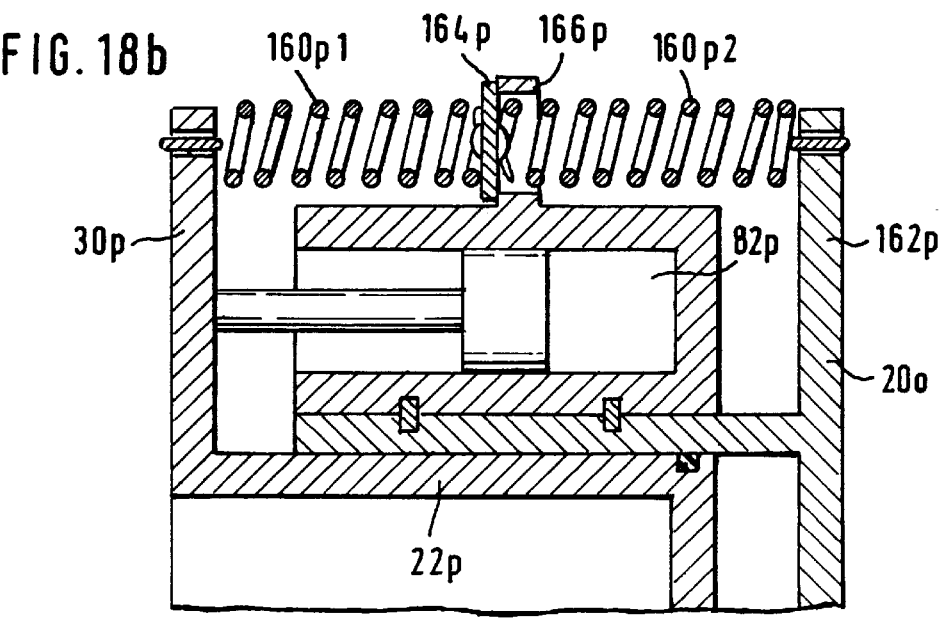
Figure 18C:
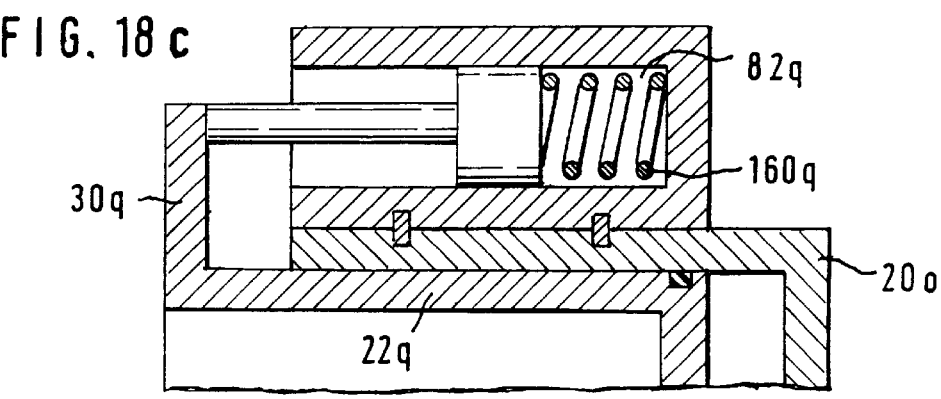

Another example is shown in FIG. 18*c*. Here, instead of the tension spring 160*o* being provided radially outside the hydraulic measurement cylinder 82*o*, a tension spring 160*q* is provided inside the hydraulic measurement cylinder 82*q*.

The tension springs in FIGS. 18a, b and c, respectively, produce a force anti-parallel to the measurement cylinder force $F_{MZ}$, so that these springs can also be described as the anti-parallel force spring arrangement.

Figure 19A:
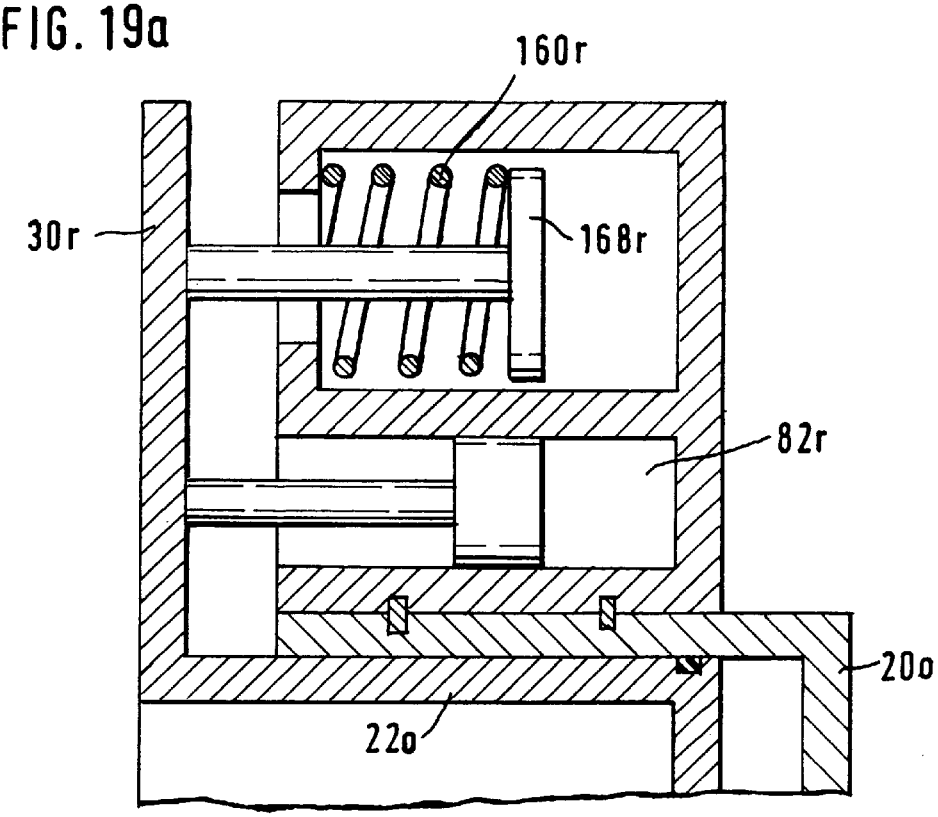
Figure 19B:
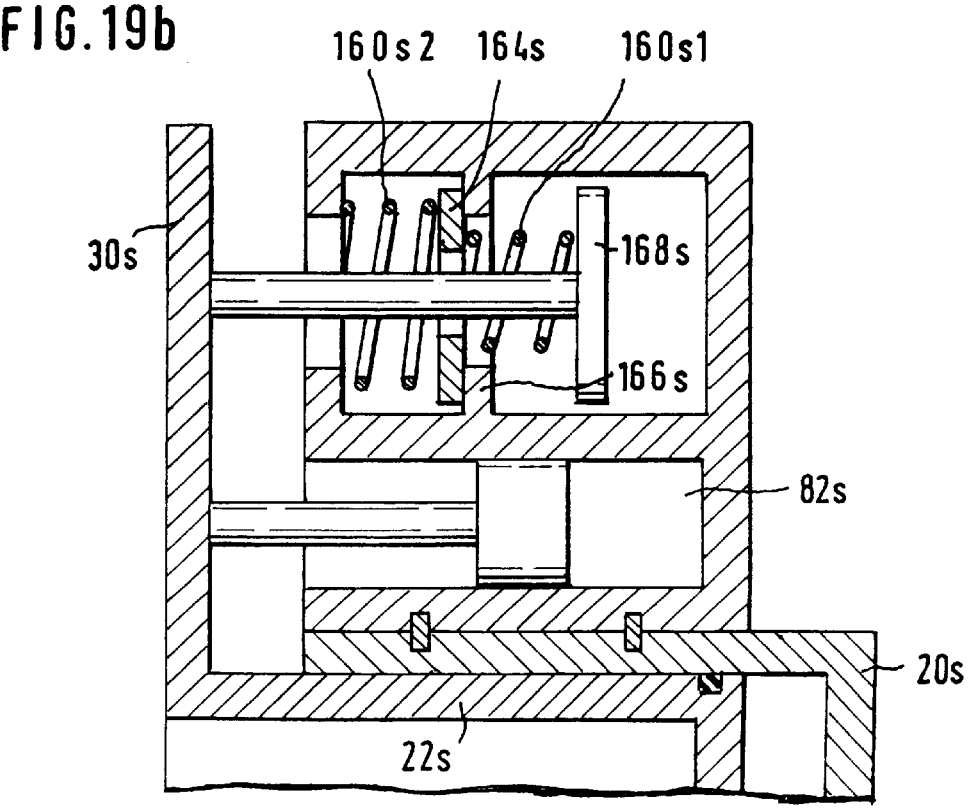
Figure 20A:
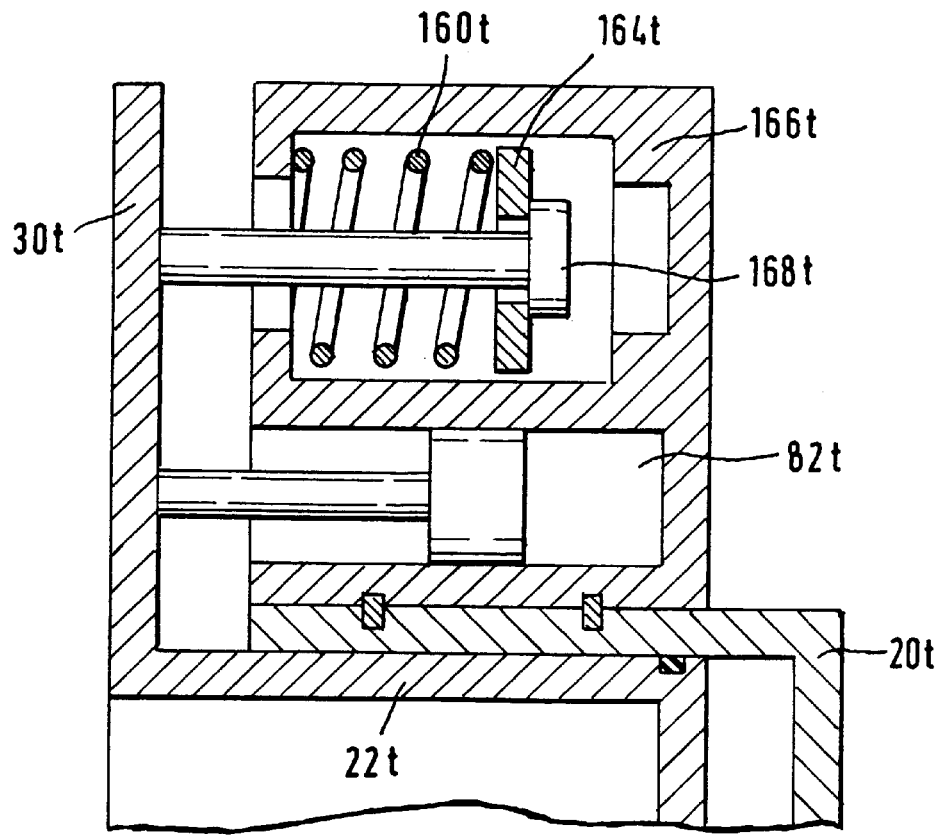
Figure 20B:
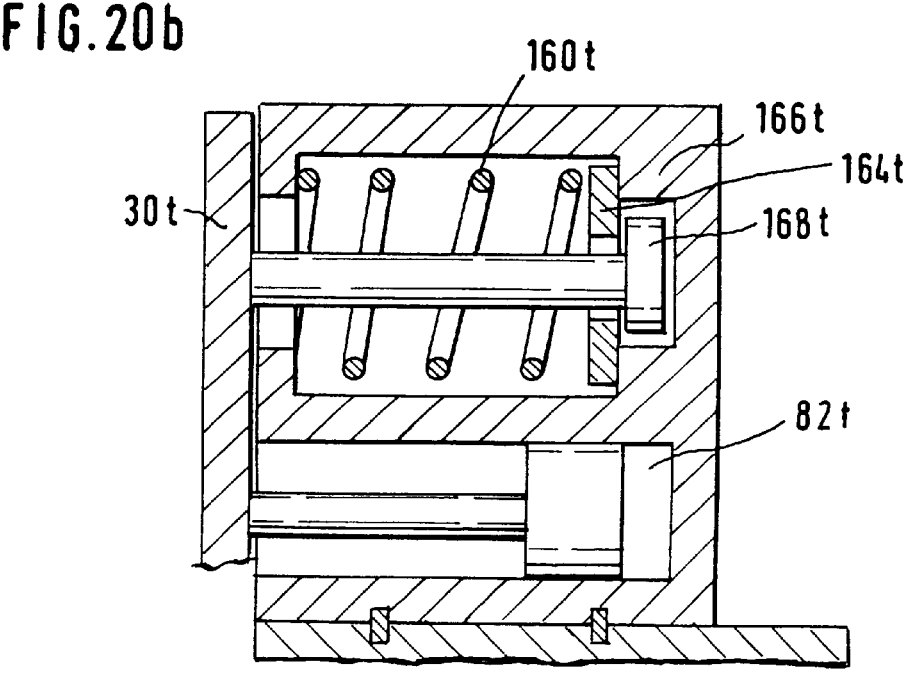
Figure 21:
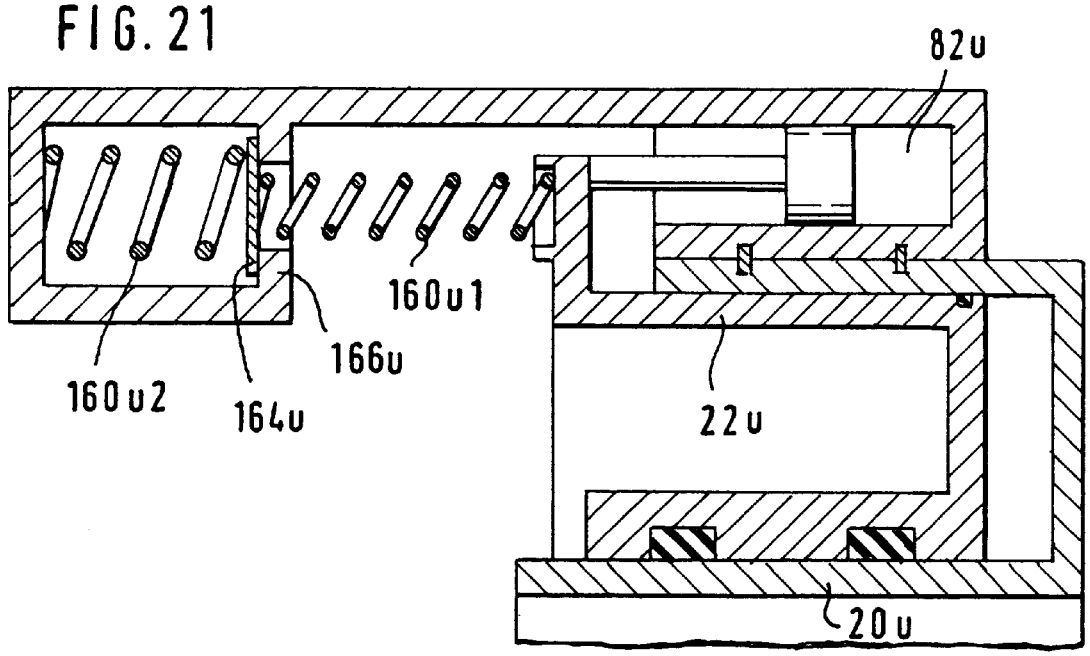

The anti-parallel force spring arrangement located on the measurement-cylinder side of the pneumatic ring cylinder s can also consist of compression springs, as illustrated by several examples in FIGS. 19, 20 and 21. For the sake of easy differentiation, tension springs are shown in the drawings in non-sectional side view and compression springs are shown sectionally.

In FIG. 19, there is a single compression spring 160r, which is arranged in a chamber provided in a common housing next to the hydraulic measurement cylinder 82r, and which rests on the housing and on a forcer 168r connected to the ring section 30r. A spring characteristic similar to that in FIG. 25a is obtained.

A spring characteristic as in FIG. 25b can be attained by the serial connection of a hard first compression spring 160s1 that is not preloaded in the engaged state of the ring piston element 22s and a soft second compression spring 160s2 that is preloaded in the engaged state of the ring piston element 22s, whereby the functional principle corresponds to that in the embodiment in FIG. 18b.

Figure 25C:
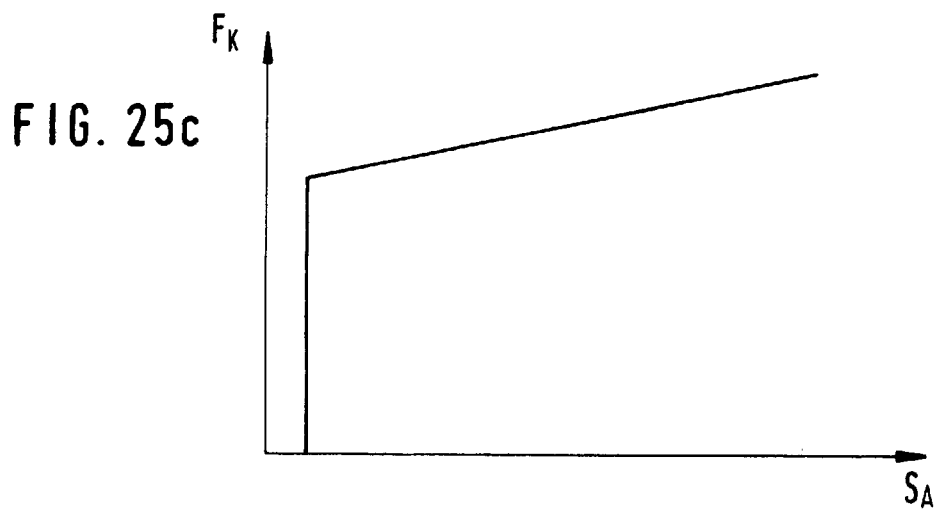
FIG. 25c shows the spring characteristic of an anti-parallel force spring arrangement comprising, for example, a preloaded compression or tension spring with associated switching means for deactivating the preload in a rest state of the pressure medium power cylinder arrangement, as a function of the clutch release bearing travel $S_A$.

Another, extremely advantageous variant is indicated in FIG. 20, which shows the ring piston element in a partially disengaged position (FIG. 20a) and in the engaged position (FIG. 20b). Here, there is only one compression spring 160t, which is preloaded in the engaged state and has a hardness approximately equal to that of the compression spring 160s2 of the example in FIG. 19b. This compression spring 160t does not act on the forcer 168t directly, but rather via a ring-shaped stop plate 164t. Upon engagement, the stop plate 164t hits against a ring-shaped stop section 166t of the housing, so that the forcer 168t is freed of the effect of the compression spring 160t and, in the engaged state, no compensation forces of the compression spring 160t are transmitted to the ring piston element 22t. The ring section 166t and the stop plate 164t can be embodied as switching means, which activate and deactivate the spring force of the compression spring 160t. As a result, an effective spring characteristic is attained, as shown in FIG. 25c.

The anti-parallel force spring arrangement comprising the compression springs of the example in FIGS. 19 and 20 is arranged offset radially outward relative to the hydraulic measurement cylinder, resulting in correspondingly larger radial dimensions of the arrangement of the pneumatic ring cylinder and control valve housing. FIG. 21 shows an example in which the dimensions are reduced in the radial direction at the expense of the dimensions in the axial direction, whereby the anti-parallel force spring arrangement with two serially connected compression springs 160u1 and 160u2 corresponds functionally to the anti-parallel force spring arrangement in FIG. 19b.

The function and structure of the anti-parallel force spring arrangement can be easily transferred to the function and structure of a parallel force spring arrangement that is located on the side of the pressure medium power cylinder arrangement opposite to the measurement cylinder and exercises a force parallel and equidirectional to the force exercised by the measurement cylinder on the movable part (ring piston element) of the pressure medium power cylinder arrangement and thus, like the described anti-parallel force spring arrangements, produces a counter tilting moment counteracting a tilting moment induced by the measurement cylinder.

Figure 22:
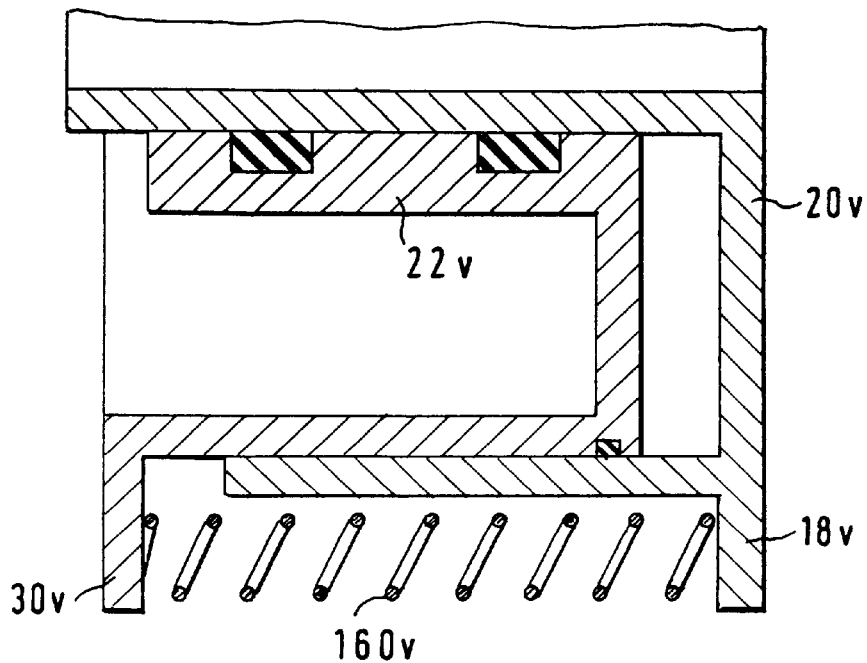
FIG. 22 and FIGS. 23a–c show the arrangement in FIG. 14 with different embodiments of a parallel force spring arrangement of a compensation spring arrangement, which counteracts a tilting moment produced by the hydraulic measurement cylinder.
Figure 26A:
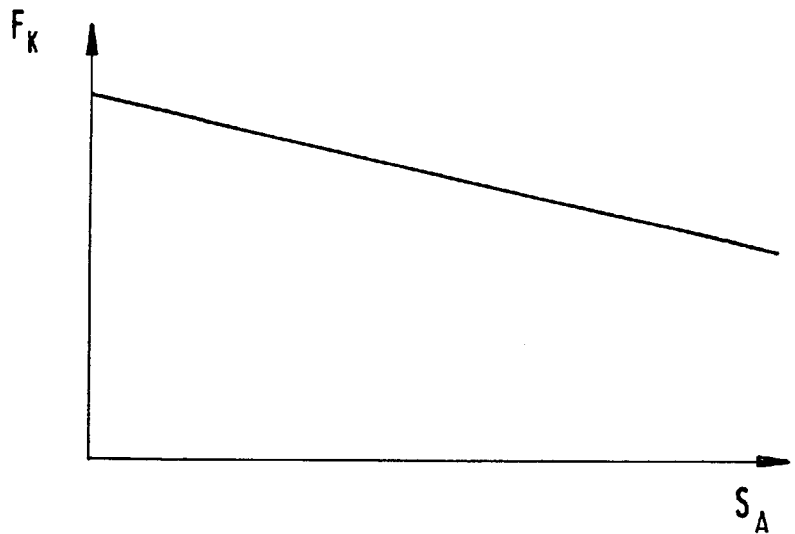
FIG. 26a shows the spring characteristic of a parallel force spring arrangement, comprising, for example, a single compression or tension spring.

FIG. 22 shows a simple example of a parallel force spring arrangement with a compensation spring 160v in the form of a compression spring, which acts between an attachment section 182v and the ring section 30v of the ring piston element 22v. In contrast to the anti-parallel force spring arrangements, in which the force $F_K$ exercised by a particular spring arrangement on the ring piston element increases during disengagement, with increasing clutch release bearing travel $S_A$, due to increasing spring tension (cf. FIG. 25), the spring tension of the compression spring preloaded in the engaged state 160v decreases during disengagement, with increasing clutch release bearing travel $S_A$, due to decreasing spring tension, as shown in FIG. 26a. This is also true for the three examples shown in FIG. 23.

Figure 23A:
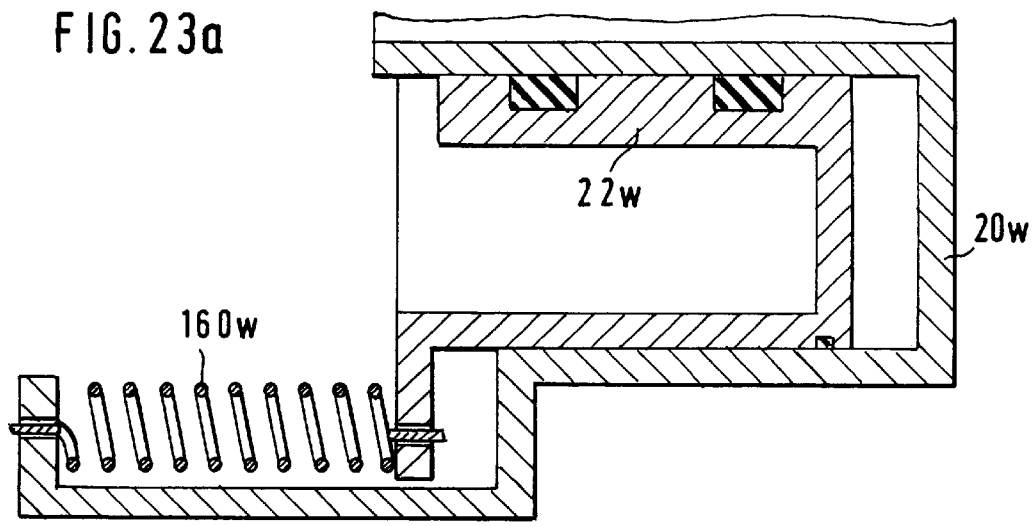
Figure 23B:
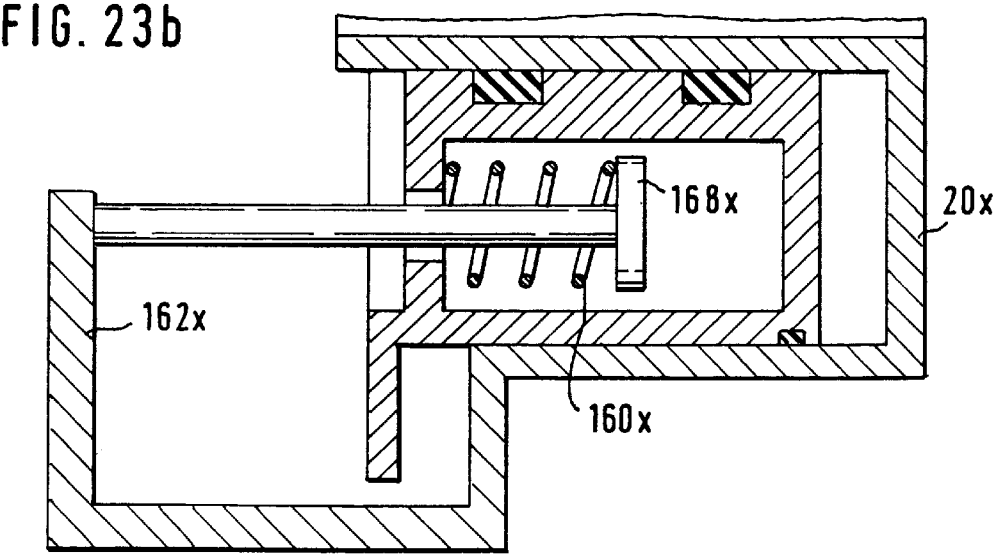
Figure 23C:
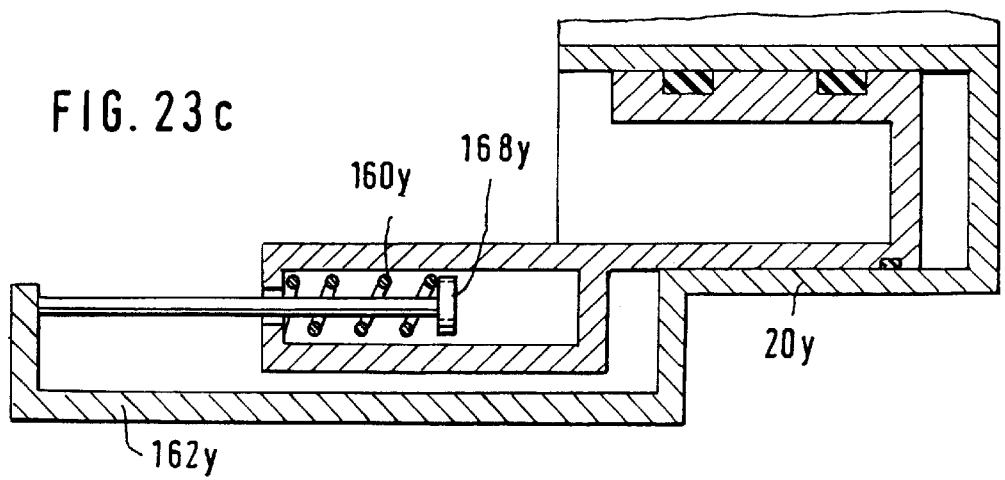

In the example in FIG. 23a, instead of the compression spring 160v, a tension spring 160w is provided as the compensation spring. Two further examples, again with a compression spring 160z or 160y, which acts via a forcer 168x or 168y on a continuation 162x or 162y of the body apart 20x or 20y, are shown in FIGS. 23b and 23c.

Figure 5:
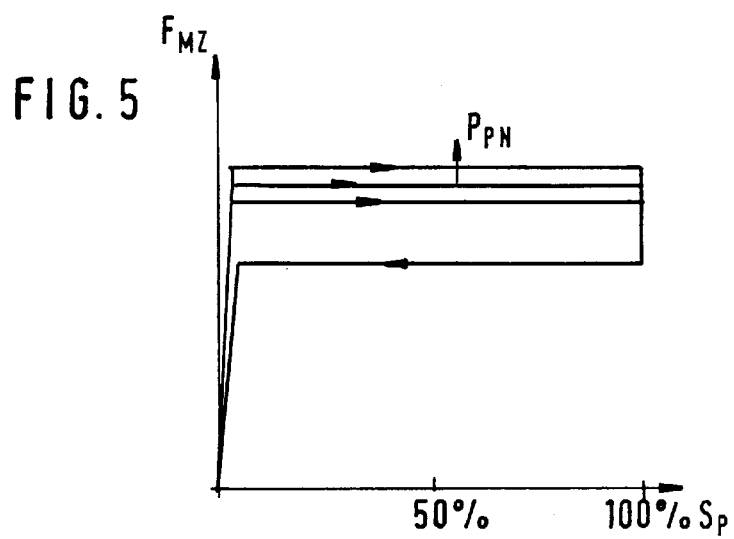
FIG. 5 shows a diagram of the ideal relationship between the pedal travel $S_P$ and the measurement cylinder force $F_{MZ}$ exercised by a measurement cylinder of an input element arrangement, for example, on a clutch release bearing arrangement, for different pneumatic pressures $P_{PN}$ as parameters.
Figure 24:
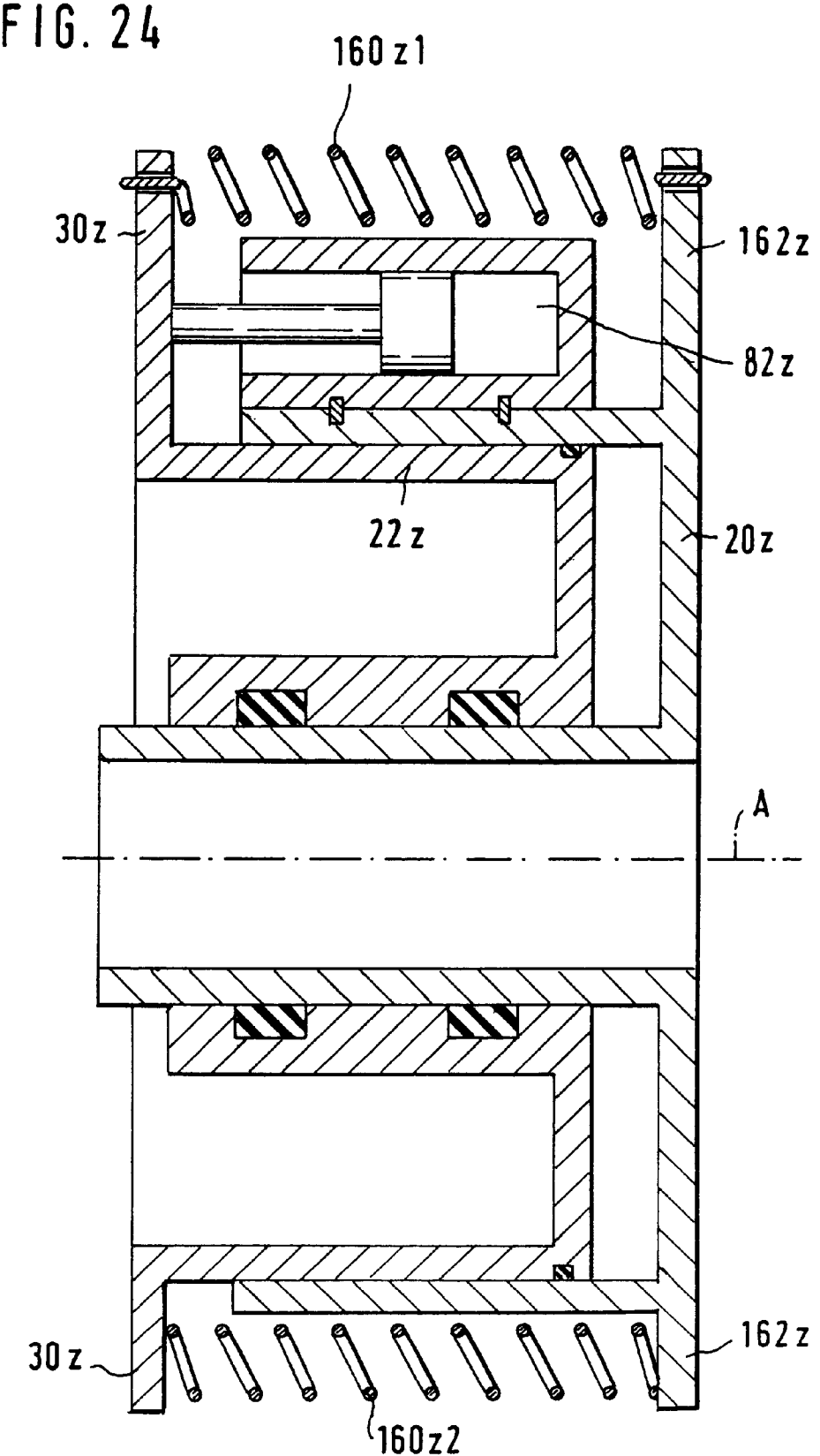
FIG. 24 shows the arrangement in FIG. 14 with a compensation spring arrangement comprising an anti-parallel force spring arrangement and a parallel force spring arrangement, which counteracts a tilting moment produced by the measurement cylinder.
Figure 26B:
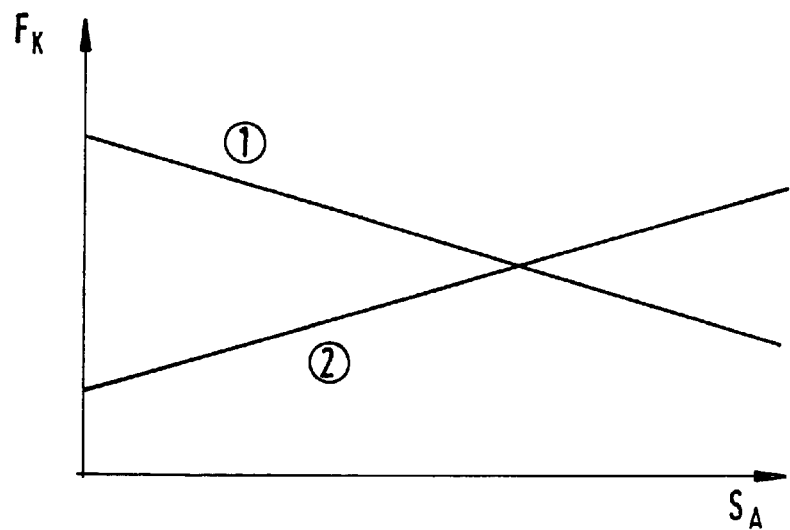
FIG. 26b shows the spring characteristics of an anti-parallel force spring arrangement and a parallel force spring arrangement of a compensation spring arrangement, which together produce a substantially constant counter tilting moment.
Figure 26C:
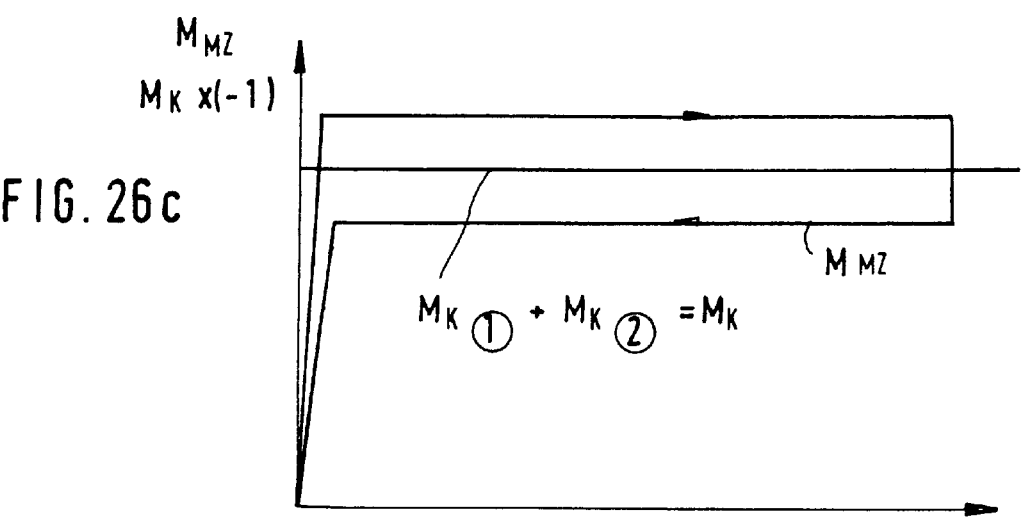
FIG. 26c shows the counter tilting moment $M_K$ produced by the compensation spring arrangement in FIG. 26b as well as the tilting moment $M_{MZ}$ produced by a hydraulic measurement cylinder, respectively, as a function of the clutch release bearing travel $S_A$.

The anti-parallel force and parallel force spring arrangements described above have a disadvantage, already mentioned, insofar as the spring forces applied by them over the clutch release bearing travel $S_A$ vary in keeping with the particular spring characteristic, so that the particular counter tilting moment produced is not constant. On the other hand, because in control valves based on the pressure-maintaining principle, it is generally possible to assume a dependence of the measurement cylinder force $F_{MZ}$ on the pedal travel $S_P$ (as shown in FIG. 5), and thus a corresponding dependence, resulting from resealing the X-axis, of the measurement cylinder force $F_{MZ}$ on the clutch release bearing travel $S_A$ (i.e., a measurement cylinder force $F_{MZ}$ that remains almost constant during engagement and disengagement), the degree of compensation or the remaining residual tilting moment changes over the clutch release bearing travel $S_A$. However, if an anti-parallel force spring arrangement and a parallel force spring arrangement are combined, then, by suitable adjustment to each other of the variables determining the particular counter tilting moment contribution, namely, the spring preload in the engaged state, the spring constants and the effective lever arm lengths (application radius), it is possible to attain a constant counter tilting moment $M_K$ over the entire clutch release bearing travel $S_A$, which, when the measurement cylinder force $F_{MZ}$ behaves as in FIG. 5, corresponds exactly to the negative of the mean value from the tilting moment $M_{MZ}$ produced by the measurement cylinder force $F_{MZ}$ during disengagement and engagement. Reference is hereby made to FIGS. 26b and 26c, whereby in FIG. 26b the curve 1 is the spring characteristic of the parallel force spring arrangement and the curve 2 is the spring characteristic of the anti-parallel force spring arrangement, and in FIG. 26 the total resulting counter tilting moment $M_K$ (times factor −1) and the underlying tilting moment characteristic $M_{MZ}$ are recorded. An example with a compensation spring arrangement, comprising an anti-parallel force spring arrangement (tension spring 160z1) and a parallel force spring arrangement (compression spring 160z2) is shown in FIG. 24.

Figure 27:
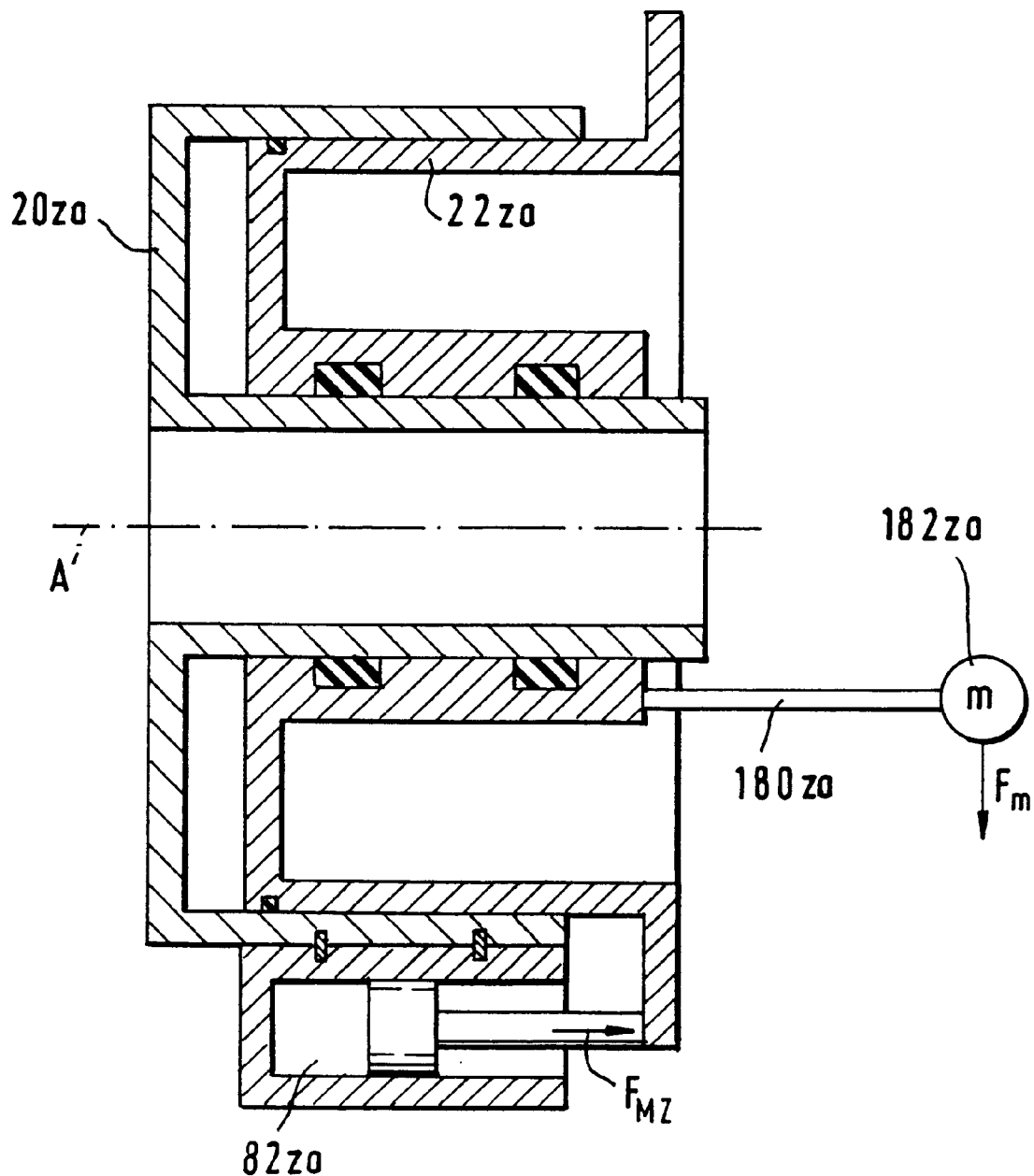
FIG. 27 shows schematically, a further variant of an operating device according to the invention with anti-tilting moment means, comprising a mass distribution of the pressure medium power cylinder arrangement.

It should again be noted that the spring arrangements described above can also be realized with elastic means other than compression springs or tension springs, for example, by means of plate springs, leg springs, leaf springs and ring springs. Compensation arrangements are also conceivable that work without spring arrangements or the like, producing the forces or counter titling moments needed for tilting moment compensation in other ways. As an example, see FIG. 27, in which a tilting force acting on the ring piston element is produced by a weight 182za with a lever arm 180za, relative to the piston guide, so as to induce a counter tilting moment that counteracts the tilting moment induced by the measurement cylinder force $F_{MZ}$ of the hydraulic measurement cylinder 82za. Ideally, the effective lever arm length of the lever arm 180za and the mass m of the weight 182za, which produces a weight force $F_m$, are adjusted to the measurement cylinder force $F_{MZ}$ and to the application radius determinant of the tilting moment in such a way that the moment resulting from the tilting and counter tilting moments is zero. The weight force $F_m$ needed to produce the counter tilting moment can also be realized with a separate weight by a suitable mass distribution of the ring piston element 22za.

In the examples described above, with the exception of the example in FIG. 10, the tilting moment induced in the pressure medium power cylinder arrangement on its movable part (pneumatic ring piston element) by the input element arrangement (measurement cylinder) is kept small from the start (example in FIG. 1) by measures according to the invention or else, according to the invention, a counter tilting moment is produced that counteracts the tilting moment, so that all told a substantially reduced or even an eliminated residual tilting moment remains. FIG. 10 shows an example in which, in the ideal case, by means of the diametrically opposed arrangement of two hydraulic measurement cylinders relative to the clutch axis, no tilting moment is induced by the input element arrangement on the ring piston element from the start.

Another way to induce no tilting moment or only an extremely slight tilting moment on the movable part of the pressure medium power cylinder arrangement due to the current value pickup by an input element arrangement is to transmit the force exercised by the input element arrangement via transmission means in a fashion free of tilting moment to the movable part of the pressure medium power cylinder arrangement, so that a resultant force of the force or forces exercised by the transmission means on the movable part is attained that is substantially coaxial to the clutch axis. The transmission means can, for example, have application means embodied symmetrical to the clutch axis A, which act on the movable part of the pressure medium power cylinder arrangement and convey the transmitted force in a manner free of tilting moment, i.e., coaxial to the clutch axis A.

An example of such transmission means is a lever arrangement with a fork section or ring section encompassing the clutch axis, which fork or ring section acts, with two substantially diametrically opposed application sections, relative to the clutch axis, on the movable part of the pressure medium power cylinder arrangement. In FIG. 28, three basic variants are shown schematically. Here, D symbolizes a stationary rotational point, for example, a rotational point (support point) of the lever H provided, for example, on the stationary part of the pressure medium power cylinder arrangement, while the arrows MZ and KZ symbolize the coupling of the measurement cylinder (arrow MZ), on the one hand, and of the movable part of the pressure medium power cylinder arrangement (power cylinder, arrow KZ), on the other, to the lever H. In FIG. 28a, there is a single-arm lever, and the measurement cylinder, relative to the rotational point D, acts radially farther outward on the lever H than the power cylinder does, so that the clutch release bearing travel $S_A$ is translated into high speed. In FIG. 28b, the measurement cylinder and the power cylinder exchange their positions relative to the rotational point D, so that the clutch release bearing travel $S_A$ is translated into low speed. FIG. 28c shows a variant with two lever arms $H_1$ and $H_2$ of a two-arm lever H, whereby the measurement cylinder and the power cylinder act on different lever arms, so that in principle any desired translations are possible.

In FIGS. 28a and 28b, the power cylinder and the measurement cylinder act from different sides on the lever H, whereas in FIG. 28c the measurement cylinder and the power cylinder act from the same side on the lever H. The arrangement of the components, however, can easily be such that, in the case of a single-arm lever, the measurement cylinder and the power cylinder act on the lever from one side thereof, and in the case of a two-arm lever, the measurement cylinder and the power cylinder act of the lever from different sides thereof.

An example in which the clutch release bearing travel $S_A$ is translated into high speed (as in FIG. 28a) is shown in FIG. 29. Here, a ring-shaped one-arm lever 200zb that encompasses the operation cylinder unit 14zb with the power cylinder is provided. The lever 200zb is rotatably supported with a support section 204zb, corresponding to one lever arm end, on a rotational bearing 202zb (cf. FIG. 29b) of the operating cylinder unit 14zb. The piston rod 88zb is linked in pivotable fashion to a coupling section 206zb of the lever lying diametrically opposite, relative to the clutch axis A, from the support section 204zb and corresponding to the other lever arm end. The lever 200zb has two application sections 208zb located diametrically opposite to each other, relative to the clutch axis A (cf. FIG. 29a), which application sections 208zb act on two diametrically opposed (relative to the clutch axis A) counter application sections of the movable part 22zb (piston element).

Figure 30A:
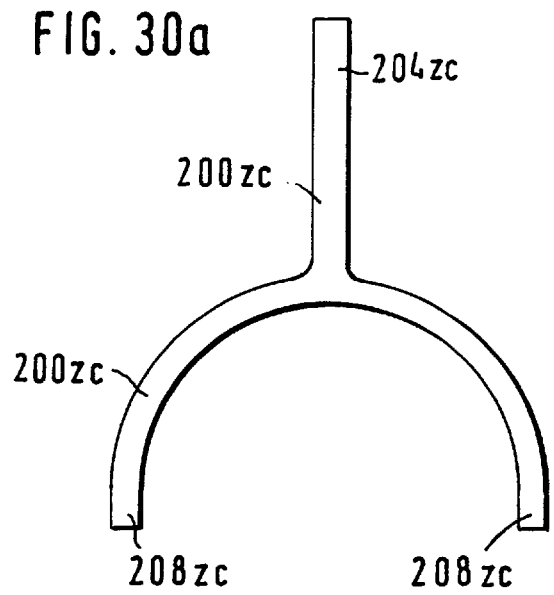
FIGS. 30a and 30b show an example of the embodiment in FIG. 28b.
Figure 30B:
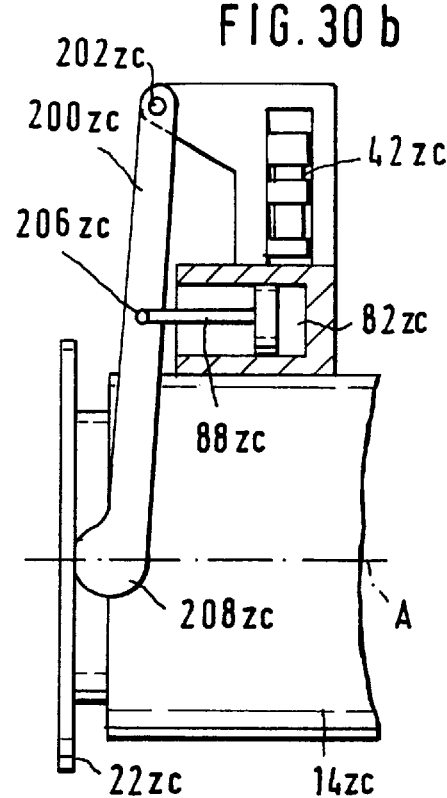

FIG. 30 shows a variant as in FIG. 28b, in which the clutch release bearing travel $S_A$ is translated into low speed. A lever 200zc is provided, which has a fork section 210zc that encompasses the operating cylinder unit 14zc and has two application sections 208zc, which diametrically opposite relative to the clutch axis A (cf. FIG. 30a). As already explained in general terms in reference to FIG. 28b, the coupling section 206zc lies between the support section 204zb attached to the rotational bearing 202zc and the application sections 208zc (cf. FIG. 30b).

Figure 31A:
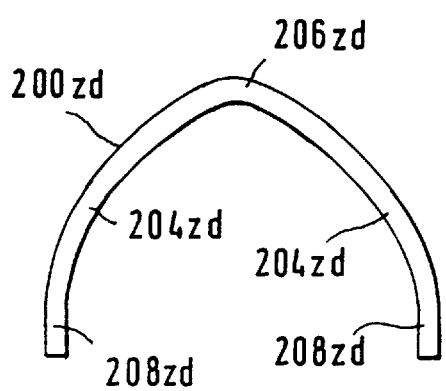
FIGS. 31a-b show an example of the embodiment in FIG. 28c.
Figure 31B:
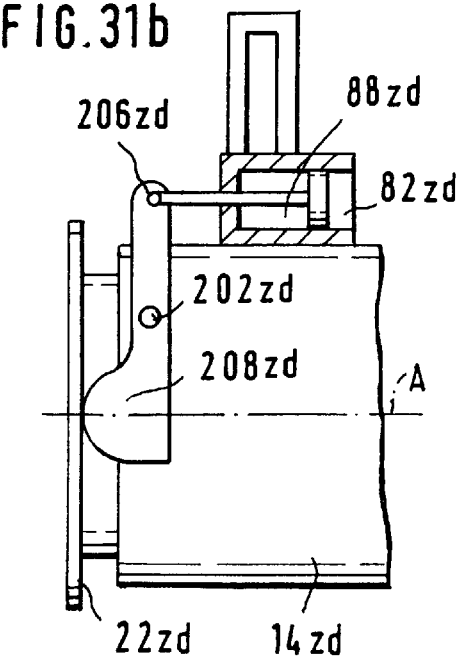
Figure 32:
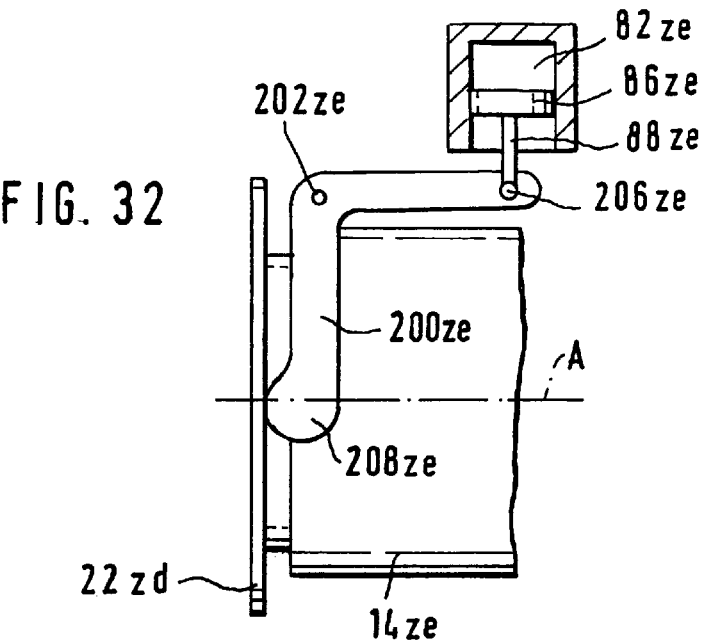
FIGS. 32 and 33 show two further examples of the embodiment in FIG. 28c.
Figure 33:
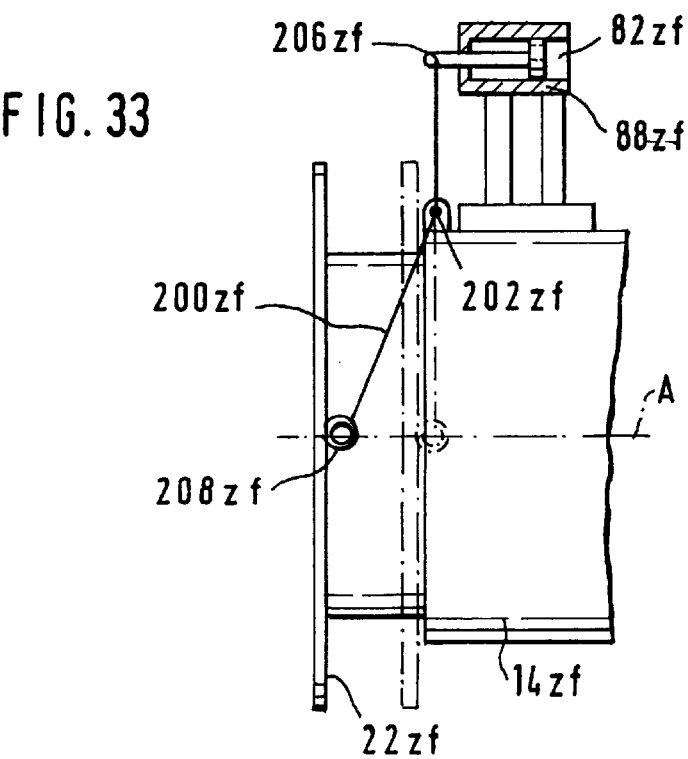

FIGS. 31, 32 and 33 show three embodiments in keeping with the embodiment in FIG. 28c. In FIG. 31, the lever is embodied as a whole in a fork-shaped (or curved) manner and encompasses the operating cylinder unit 14zd in such a way that two application sections 208zd provided on the two free ends of the lever 200zd are arranged diametrically opposite relative to the clutch axis A (cf. FIG. 31a). The lever 200zb is mounted on two support sections 204zd on two rotational bearings 202zd of the operating cylinder unit 14zd, whereby the support sections 204zd, in keeping with the basic principle illustrated in FIG. 28c, lie respectively between an application section 208zd and the coupling section 206zd.

Deviating from the embodiment in FIG. 31, in which the two lever arms (in the top view in FIG. 31b) extend in the same direction, the lever can be designed as a knee lever, for example, with an angle of approximately 90 degrees between the two lever arms, such as the lever 200ze in the example in FIG. 32. In this way, it is possible to attain sharply differing movement directions of the piston element 22ze and of the piston 86ze of the hydraulic measurement cylinder 82ze, e.g., movement directions roughly orthogonal to each other, as shown in FIG. 32. In the example in FIG. 33, which also has a knee lever 200zf, a smaller angle is provided between the two lever arms and the movement directions are parallel to each other.

Finally, it should be pointed out that the different solutions described above for reducing, compensating for or largely avoiding a tilting moment that acts on a movable part of the pressure medium power cylinder arrangement can be provided not only alone, but also in combination; for example, the tilting moment reduction as in the solution in FIG. 1 can be combined with the tilting moment compensation as in one or more variants (e.g., compensation by means of pneumatic auxiliary cylinder and/or compensation spring arrangement).

In summary, for an operating device of a friction clutch arranged in the drive train of a motor vehicle, comprising a positioning servo arrangement with a pressure medium power cylinder arrangement acting on a clutch release bearing arrangement and arranged inside the housing bell, it is proposed according to the invention that the pressure medium power cylinder arrangement, an input element arrangement associated with a control valve, and, in some cases, additional anti-tilting moment means be embodied and/or adjusted to each other and/or to the clutch in such a way that the resultant force from the forces exercised by the input element arrangement and, in some cases, the additional anti-tilting moment means directly or indirectly on the clutch release bearing arrangement or on the clutch release bearing side arrangement of the pressure medium power cylinder arrangement are substantially coaxial to the clutch axis at least during at least one clutch operating phase.

The invention is not limited by the embodiments described above which are presented as examples only but can be modified in various ways within the scope of protection defined by the appended patent claims.

We claim:

1. An operating device for a friction clutch arranged in a drive train of a motor vehicle between an internal combustion engine and a transmission in a housing bell, comprising:
    clutch release bearing means movable substantially coaxially to the friction clutch for operating the friction clutch;
    positioning servo means including a pressure medium power cylinder arrangement that is arranged inside the housing bell and acts on the clutch release bearing means;
    a pressure medium source; and
    a control valve connected to the pressure medium source and operatively connected to the pressure medium power cylinder arrangement so as to operate the power cylinder arrangement in dependence on a guide quantity which represents a target position, and a current variable which represents an axial position of the clutch release bearing arrangement, the pressure medium power cylinder arrangement including at least one pressure medium main cylinder arranged to encompass the clutch axis, the positioning servo means further including an input element arrangement operatively associated with one of the clutch release bearing means and a clutch release bearing means side of the pressure medium power cylinder arrangement for detecting the current variable, the pressure medium power cylinder arrangement and the input element arrangement being configured and arranged relative to each other and the clutch so that forces exercised by the pressure medium power cylinder arrangement and the input element arrangement and by the clutch on one of the clutch release bearing means and the clutch release bearing means side of the pressure medium power cylinder arrangement, at least during at least one clutch operation phase, produce no substantial resulting tilting moment that acts on the clutch release bearing means side of the pressure medium power cylinder arrangement which would cause self-locking of the pressure medium power cylinder arrangement, in relation to a stationary side of the pressure medium power cylinder arrangement.

2. An operating device as defined in claim 1, wherein the at least one pressure medium main cylinder is a pressure medium ring cylinder.

3. An operating device as defined in claim 1, and further comprising anti-tilting moment means for preventing a tilting moment in the pressure medium power cylinder arrangement.

4. An operating device for a friction clutch arranged in a drive train of a motor vehicle between an internal combustion engine and a transmission in a housing bell, comprising:
    clutch release bearing means movable substantially coaxially to the friction clutch for operating the friction clutch;
    positioning servo means including a pressure medium power cylinder arrangement that is arranged inside the housing bell and acts on the clutch release bearing means;
    a pressure medium source; and
    a control valve connected to the pressure medium source and operatively connected to the pressure medium power cylinder arrangement so as to operate the power cylinder arrangement in dependence on a guide quantity which represents a target position, and a current variable which represents an axial position of the clutch release bearing arrangement, the pressure medium power cylinder arrangement including at least one pressure medium main cylinder arranged to encompass the clutch axis, the positioning servo means further including an input element arrangement operatively associated with one of the clutch release bearing means and a clutch release bearing means side of the pressure medium power cylinder arrangement for detecting the current variable, the pressure medium power cylinder arrangement and the input element arrangement being configured and arranged to direct a force on one of the clutch release bearing means and the clutch release bearing means side of the pressure medium power cylinder arrangement that is substantially coaxial to the clutch axis at least during one clutch operating phase.

5. An operating device as defined in claim 4, and further comprising anti-tilting moment means for preventing a tilting moment in the pressure medium power cylinder arrangement.

6. An operating device as defined in claim 1, the positioning servo means comprises one of a mechanical positioning control arrangement and a hydraulic positioning control arrangement.

7. An operating device as defined in claim 1, wherein the input element arrangement comprises at least one of a mechanically connected input element that detects the position of at least one of the clutch release bearing means and a hydraulic measurement cylinder arrangement operatively arranged inside the housing bell so as to detect the position of the clutch release bearing means.

8. An operating device as defined in claim 7, wherein the hydraulic measurement cylinder arrangement has exactly one measurement cylinder which is axis-parallel to the clutch axis.

9. An operating device for a friction clutch arranged in a drive train of a motor vehicle, between an internal combustion engine and a transmission in a housing bell, comprising:
    clutch release bearing means movable substantially coaxially to the friction clutch for operating the friction clutch;

positioning servo means including a pressure medium power cylinder arrangement that is arranged inside the housing bell and acts on the clutch release bearing means;

a pressure medium source;

a control valve connected to the pressure medium source and operatively connected to the pressure medium power cylinder arrangement so as to operate the power cylinder arrangement in dependence on a guide quantity which represents a target position, and a current variable which represents an axial position of the clutch release bearing arrangement, the pressure medium power cylinder arrangement including at least one pressure medium main cylinder arranged to encompass the clutch axis, the positioning servo means further including an input element arrangement operatively associated with one of the clutch release bearing means and a clutch release bearing means side of the pressure medium power cylinder arrangement for detecting the current variable, the pressure medium power cylinder arrangement being operatively configured and arranged to produce a counter tilting movement for a substantially complete compensation of a tilting moment produced by the input element arrangement on the clutch release bearing arrangement side of the pressure medium power cylinder arrangement, at least during at least one clutch operating phase; and anti-tilting movement means for providing a counter-tilting movement.

10. An operating device as defined in claim 9, wherein the pressure medium power cylinder arrangement comprises at least one pressure medium auxiliary cylinder arranged substantially axis-parallel to the clutch axis, and produces, at least during the clutch operation phase, at least a contribution to the counter tilting moment.

11. An operating device as defined in claim 9, wherein the pressure medium main cylinder is a ring cylinder is eccentric to the clutch axis so as to produce, at least during the clutch operation phase, at least a contribution to the counter tilting moment.

12. An operating device as defined in claim 11, wherein the pressure medium ring cylinder has cylinder walls concentric to a ring cylinder axis, and is arranged so that the ring cylinder axis is offset relative to the clutch axis and is substantially parallel to the clutch axis.

13. An operating device as defined in claim 11, wherein the ring cylinder has a radially outer ring cylinder wall concentric to a first ring cylinder axis and a radially inner ring cylinder wall concentric to a second ring cylinder axis that are eccentric to each other, the two ring cylinder axes being substantially parallel to each other and at least one of the ring cylinder axes being substantially parallel to the clutch axis.

14. An operating device as defined in claim 9, wherein the anti-tilting moment means includes a compensation spring arrangement which is active between the stationary side of the pressure medium power cylinder arrangement, and one of the clutch release bearing means side of the pressure medium power cylinder arrangement and the clutch release bearing means so as to produce, at least during the clutch operating phase, at least a contribution to the counter tilting moment.

15. A operating device as defined in claim 14, wherein the compensation spring arrangement comprises an anti-parallel force spring arrangement operatively arranged to exercise, at least during the clutch operating phase, a compensation force on one of the clutch release bearing means and the clutch release bearing means side of the pressure medium power cylinder arrangement, the compensation force having force components oriented substantially opposite to an input element arrangement force exercised by the input element arrangement on one of the clutch release bearing means and the clutch release bearing means side of the pressure medium power cylinder arrangement.

16. An operating device as defined in claim 15, wherein the anti-parallel force spring arrangement is arranged to act, during disengagement of the clutch release bearing means side of the pressure medium power cylinder arrangement, relative to the clutch axis, on a common side with the input element arrangement on one of the pressure medium power cylinder arrangement and the clutch release bearing means and produces a compensation force that is anti-parallel to the input element arrangement force.

17. An operating device as defined in claim 15, wherein the compensation force and the input element arrangement force lie on a common plane containing at least one of the clutch axis and a pressure medium power cylinder arrangement axis, so that the compensation force is coaxial to the input element arrangement force.

18. An operating device as defined in claim 15, wherein the compensation spring arrangement comprises a parallel force spring arrangement arranged to exercise a compensation force, at least during the clutch operating phase, on one of the clutch release bearing means and the clutch release bearing means side of the pressure medium power cylinder arrangement, for producing one of the counter tilting moment and the contribution to the counter tilting moment, the compensation force having force components directed in substantially a common direction with an input element arrangement force exercised by the input element arrangement on one of the clutch release bearing means and the clutch release bearing means side of the pressure medium power cylinder arrangement.

19. An operating device as defined in claim 18, wherein the parallel force spring arrangement is arranged to act during engagement of the clutch release bearing means side of the pressure medium power cylinder arrangement, relative to the clutch axis, on a side opposite to the input element arrangement on one of the pressure medium power cylinder arrangement and the clutch release bearing means and produces a compensation force that is parallel to the input element arrangement force.

20. An operating device as defined in claim 18, wherein the compensation force and the input element arrangement force lie on a common plane containing at least one of the clutch axis and a pressure medium cylinder arrangement axis so that the compensation force axis, relative to one of the clutch axis and the pressure medium cylinder arrangement axis, is symmetrical to the input element arrangement force axis.

21. An operating device as defined in claim 18, wherein the anti-parallel force arrangement and the parallel force spring arrangement, of which the anti-parallel force spring arrangement is tensible during disengagement and the parallel force spring arrangement during engagement of the clutch release bearing means side of the pressure medium power cylinder arrangement, are arranged to jointly produce, at least during the clutch operating phase, one of a substantially constant counter tilting moment and a substantially constant counter tilting moment contribution, regardless of disengagement position.

22. An operating device as defined in claim 14, wherein the compensation spring arrangement includes a compression spring arrangement with at least one compression spring.

23. An operating device as define in claim 22, wherein the compression spring arrangement includes at least one compression spring preloaded in a rest position of the pressure medium power cylinder arrangement so that the rest position corresponds to an engaged state of the pressure medium power cylinder arrangement.

24. An operating device as defined in claim 23, wherein the compression spring arrangement includes at least one serial connection of at least two compression springs.

25. An operating device as defined in claim 24, wherein at least one of the serially connected compression springs is a harder compression spring and is not preloaded in the rest position, at least one other of the compression springs is a softer compression spring that is preloaded in the rest position.

26. An operating device as defined in claim 14, wherein the compensation spring arrangement includes a tension spring arrangement with at least one tension spring.

27. An operating device as defined in claim 26, wherein the tension spring arrangement includes at least one tension spring preloaded in a rest position of the pressure medium power cylinder arrangement so that the rest position corresponds to an engaged state of the pressure medium power cylinder arrangement.

28. An operating device as defined in claim 27, wherein the tension spring arrangement includes at least two series-connected tension springs of different spring hardnesses.

29. An operating device as defined in claim 28, wherein at least one of the series-connected tension springs is a harder tension spring and is not preloaded in the rest position, and at least one other of the tension spring is a softer tension spring that is preloaded in the rest position.

30. An operating device as defined in claim 14, and further comprising switching means, associated with the compensation spring arrangement, for activating and deactivating the compensation force exercised by the compensation spring arrangement on one of the clutch release bearing means and the clutch release bearing means side of the pressure medium power cylinder arrangement, in dependence on the disengagement position of the pressure medium power cylinder arrangement.

31. An operating device as defined in claim 30, wherein the compensation force of the compensation spring arrangement preloaded in a rest position of the pressure medium power cylinder arrangement is deactivated in the rest position so that the rest position corresponds to the engaged state of the pressure medium power cylinder arrangement.

32. An operating device as defined in claim 9, wherein the anti-tilting moment means includes a mass distribution of one of the pressure medium power cylinder arrangement and the clutch release bearing means, and at least one separate weight element whose weight force acts on one of the clutch release bearing means and the clutch release bearing means side of the pressure medium power cylinder arrangement so as to produce, at least during the clutch operating phase, one of the counter tilting moment and the contribution to the counter tilting moment.

33. An operating device for a friction clutch arranged in a drive train of a motor vehicle, between an internal combustion engine and a transmission in a housing bell, comprising:

clutch release bearing means movable substantially coaxially to the friction clutch for operating the friction clutch;

positioning servo means including a pressure medium power cylinder arrangement that is arranged inside the housing bell and acts on the clutch release bearing means;

a pressure medium source;

a control valve connected to the pressure medium source and operatively connected to the pressure medium power cylinder arrangement so as to operate the power cylinder arrangement in dependence on a guide quantity which represents a target position, and a current variable which represents an axial position of the clutch release bearing arrangement, the pressure medium power cylinder arrangement including at least one pressure medium main cylinder arranged to encompass the clutch axis, the positioning servo means further including an input element arrangement operatively associated with one of the clutch release bearing means and a clutch release bearing means side of the pressure medium power cylinder arrangement for detecting the current variable; and application radius reduction means for at least minimizing a tilting moment produced by the input element arrangement and acting on the clutch release bearing means side of the pressure medium power cylinder arrangement, the application radius reduction means including anti-tilting moment means which reduce an application radius relative to one of the pressure medium cylinder arrangement axis and the clutch axis that is determinant for the tilting moment, and relative to a radial distance between a movement axis of an input element connected in terms of movement to the clutch release bearing means side of the pressure medium power cylinder arrangement and one of the pressure medium power cylinder arrangement axis and the clutch axis.

34. An operating device as defined in claim 33, wherein the application radius reduction means includes a coupling point that at most transmits a tilting moment to a reduced extent between a carrier element movably connected with one of the clutch release bearing means and the clutch release bearing means side of the pressure medium power cylinder arrangement, and a follower element movably connected to the input element so that the coupling point is offset relative to the movement axis in the direction of the clutch axis.

35. An operating device as defined in claim 34, wherein the coupling point is one of an articulated point and a stop point that is effective in at least one axial direction.

36. Operating device for a friction clutch arranged in a drive train of a motor vehicle, between an internal combustion engine and a transmission in a housing bell, comprising:

clutch release bearing means movable substantially coaxially to the friction clutch for operating the friction clutch;

positioning servo means including a pressure medium power cylinder arrangement that is arranged inside the housing bell and acts on the clutch release bearing means;

a pressure medium source; and a control valve connected to the pressure medium source and operatively connected to the pressure medium power cylinder arrangement so as to operate the power cylinder arrangement in dependence on a guide quantity which represents a target position, and a current variable which represents an axial position of the clutch release bearing arrangement, the pressure medium power cylinder arrangement including at least one pressure medium main cylinder arranged to encompass the clutch axis, the positioning servo means further including an input element arrangement operatively associated with one of the clutch release bearing means and a clutch release bearing means side of the pressure medium power cylinder arrangement for detecting the current variable; and anti-tilting moment means for at least minimizing a tilting moment produced by the input element arrangement and acting on the clutch release bearing means side of the pressure medium power cylinder arrangement, the anti-tilting moment means being integrated into the input element arrangement, the input element arrangement including an input element connected to the clutch release bearing means side of the pressure medium power cylinder arrangement, and a detection arrangement which outputs a reaction force on the input element, the anti-tilting moment means being operative to counteract the reaction force.

37. An operating device as defined in claim 36, wherein the anti-tilting moment means integrated in the input element arrangement includes a counter force spring arrangement, the counter force spring arrangement having an anti-parallel force spring arrangement operatively arranged to exercise, at least during the clutch operating phase, a compensation force on one of the clutch release bearing means and the clutch release bearing means side of the pressure medium power cylinder arrangement, the compensation force having force components oriented substantially opposite to an input element arrangement force exercised by the input element arrangement on one of the clutch release bearing means and the clutch release bearing means side of the pressure medium power cylinder arrangement.

38. An operating device as defined in claim 37, wherein the anti-parallel force spring arrangement is arranged to act, during disengagement of the clutch release bearing means side of the pressure medium power cylinder arrangement, relative to the clutch axis, on a common side with the input element arrangement on one of the pressure medium power cylinder arrangement and the clutch release bearing means and produces a compensation force that is anti-parallel to the input element arrangement force.

39. An operating device as defined in claim 37, wherein the compensation force and the input element arrangement force lie on a common plane containing at least one of the clutch axis and a pressure medium power cylinder arrangement axis, so that the compensation force is coaxial to the input element arrangement force.

40. An operating device as defined in claim 36, wherein the anti-tilting moment means integrated in the input element arrangement includes a counter force spring arrangement having a compression spring arrangement with at least one compression spring.

41. An operating device as define in claim 40, wherein the compression spring arrangement includes at least one compression spring preloaded in a rest position of the pressure medium power cylinder arrangement so that the rest position corresponds to an engaged state of the pressure medium power cylinder arrangement.

42. An operating device as defined in claim 41, wherein the compression spring arrangement includes at least one serial connection of at least two compression springs.

43. An operating device as defined in claim 42, wherein at least one of the serially connected compression springs is a harder compression spring and, is not preloaded in the rest position, at least one other of the compression springs is a softer compression spring, is preloaded in the rest position.

44. An operating device as defined in claim 36, wherein the anti-tilting moment means includes a counter force spring arrangement having a tension spring arrangement with at least one tension spring.

45. An operating device as defined in claim 44, wherein the tension spring arrangement includes at least one tension spring preloaded in a rest position of the pressure medium power cylinder arrangement, so that the rest position corresponds to an engaged state of the pressure medium power cylinder arrangement.

46. An operating device as defined in claim 45, wherein the tension spring arrangement includes at least one serial connection of at least two tension springs of different spring hardnesses.

47. An operating device as defined in claim 46, wherein at least one of the serially connected tension springs is a harder tension spring and is not preloaded in the rest position, and at least one other, of the tension spring a softer tension spring that is preloaded in the rest position.

48. An operating device for a friction clutch arranged in a drive train of a motor vehicle, between an internal combustion engine and a transmission in a housing bell, comprising:

clutch release bearing means movable substantially coaxially to the friction clutch for operating the friction clutch;

positioning servo means including a pressure medium power cylinder arrangement that is arranged inside the housing bell and acts on the clutch release bearing means;

a pressure medium source; and a control valve connected to the pressure medium source and operatively connected to the pressure medium power cylinder arrangement so as to operate the power cylinder arrangement in dependence on a guide quantity which represents a target position, and a current variable which represents an axial position of the clutch release bearing arrangement, the pressure medium power cylinder arrangement including at least one pressure medium main cylinder arranged to encompass the clutch axis, the positioning servo means further including an input element arrangement operatively associated with one of the clutch release bearing means and a clutch release bearing means side of the pressure medium power cylinder arrangement for detecting the current variable; and transmission means for at least minimizing a tilting moment produced by the input element arrangement and acting on the clutch release bearing means side of the pressure medium power cylinder arrangement, the transmission means including anti-tilting moment means that connect an input element not coaxial to the clutch axis in terms of movement and in a manner free of tilting moment to one of the clutch release bearing means and the clutch release bearing means side of the pressure medium power cylinder arrangement so that a resultant force exercised by the transmission means on one of the clutch release bearing means and the clutch release bearing means side of the pressure medium power cylinder arrangement is substantially coaxial to the clutch axis.

49. An operating device as defined in claim 48, wherein the transmission means includes a lever arrangement with a lever supported in a pivotable fashion on a stationary support point, a first lever arm that has one of a fork section and a ring section that encircles the clutch axis and two application sections substantially diametrically opposed relative to the clutch axis so as to act on one of the clutch release bearing means and the clutch release bearing means side of the pressure medium cylinder arrangement.

50. An operating device as defined in claim 49, wherein the lever is supported on a supporting end of the first lever arm, and the input element is connected to a coupling section of the first lever arm.

51. An operating device as defined in claim 50, wherein the application sections lie between the supporting end and the coupling section.

52. An operating device as defined in claim 50, wherein the coupling section lies between the supporting end and the application sections.

53. An operating device as defined in claim 49, wherein the lever is supported on a supporting section between the first lever arm and a second lever arm, the input element being connected to a coupling section of the second lever arm.

54. An operating device as defined in claim 1, wherein the input element arrangement is substantially symmetrical to the clutch axis so as to avoid tilting moment.

55. An operating device as defined in claim 4, wherein the input element arrangement is substantially symmetrical to the clutch axis so as to avoid tilting moment.

56. An operating device as defined in claim 7, wherein the input element arrangement is substantially symmetrical to the clutch axis so as to avoid tilting moment, the measurement cylinder arrangement having a ring measurement cylinder substantially concentric to the clutch axis.

57. An operating device as defined in claim 7, wherein the input element arrangement is substantially symmetrical to the clutch axis so as to avoid tilting moment, and further comprising a measurement cylinder arrangement having a plurality of measurement cylinders axis-parallel to the clutch axis and arranged so as to be distributed around the clutch axis at a common circumferential angle and radial distance.

58. An operating device as defined in claim 1, wherein the pressure medium power cylinder arrangement is configured to avoid a tilting moment symmetrical to the clutch axis.

59. An operating device as defined in claim 4, wherein the pressure medium power cylinder arrangement is configured to avoid a tilting moment symmetrical to the clutch axis.

60. An operating device as defined in claim 9, wherein the pressure medium power cylinder arrangement is configured to avoid a tilting moment symmetrical to the clutch axis.

61. An operating device as defined in claim 1, wherein the pressure medium power cylinder arrangement includes a pressure medium ring cylinder concentric to the clutch axis, and at least one pressure medium auxiliary cylinder offset radially outward relative to the ring cylinder and axis-parallel to the clutch axis.

62. An operating device as defined in claim 4, wherein the pressure medium power cylinder arrangement includes a pressure medium ring cylinder concentric to the clutch axis, and at least one pressure medium auxiliary cylinder offset radially outward relative to the ring cylinder and axis-parallel to the clutch axis.

63. An operating device as defined in claim 9, wherein the pressure medium power cylinder arrangement includes a pressure medium ring cylinder concentric to the clutch axis, and at least one pressure medium auxiliary cylinder offset radially outward relative to the ring cylinder and axis-parallel to the clutch axis.

64. An operating device as defined in claim 1, wherein the pressure medium power cylinder arrangement includes a plurality of pressure medium cylinders axis-parallel to the clutch axis and distributed around the clutch axis at a common circumferential angle and radial distance, and at least one pressure medium auxiliary cylinder offset radially outward relative to the pressure medium cylinders and axis-parallel to the clutch axis.

65. An operating device as defined in claim 4, wherein the pressure medium power cylinder arrangement includes a plurality of pressure medium cylinders axis-parallel to the clutch axis and distributed around the clutch axis at a common circumferential angle and radial distance, and at least one pressure medium auxiliary cylinder offset radially outward relative to the pressure medium cylinders and axis-parallel to the clutch axis.

66. An operating device as defined in claim 1, wherein the pressure medium power cylinder arrangement includes a plurality of pressure medium cylinders axis-parallel to the clutch axis and distributed around the clutch axis at a common circumferential angle and radial distance, and at least one pressure medium auxiliary cylinder offset radially outward relative to the pressure medium cylinders and axis-parallel to the clutch axis.

67. An operating device as defined in claim 7, wherein the pressure medium power cylinder arrangement includes at least one pressure medium cylinder axis-parallel to the clutch axis, the measurement cylinder arrangement having at least one measurement cylinder axis-parallel to the clutch axis, the at least one measurement cylinder and the at least one pressure medium cylinder being arranged at approximately a common radial distance to the clutch axis and diametrically opposite one another relative to the clutch axis.

68. An operating device as defined in claim 1, wherein the control valve comprises a valve arrangement which can be switched between a first control state connecting the pressure medium power cylinder arrangement to the pressure medium source and a second control state connecting the pressure medium power cylinder arrangement to a pressure compensation opening and, selectively a third control state, in which the pressure medium power cylinder arrangement is sealed in a substantially pressure-medium-tight fashion, in dependence on a differential variable associated with the current variable and the control variable.

69. An operating device as defined in claim 68, wherein the control valve has a port hydraulically connected to a measurement cylinder arrangement of the input element arrangement so that by switching between control states the control valve maintains, at least during the clutch operating phase, a substantially constant hydraulic pressure dependent on at least one of pressure medium pressure and movement direction of the clutch release bearing means side of the pressure medium power cylinder arrangement, in the measurement cylinder arrangement.

70. An operating device as defined in claim 4, wherein the control valve comprises a valve arrangement which can be switched between a first control state connecting the pressure medium power cylinder arrangement to the pressure medium source and a second control state connecting the pressure medium power cylinder arrangement to a pressure compensation opening and, selectively a third control state, in which the pressure medium power cylinder arrangement is sealed in a substantially pressure-medium-tight fashion, in dependence on a differential variable associated with the current variable and the control variable.

71. An operating device as defined in claim 9, wherein the control valve comprises a valve arrangement which can be switched between a first control state connecting the pressure medium power cylinder arrangement to the pressure medium source and a second control state connecting the pressure medium power cylinder arrangement to a pressure compensation opening and, selectively a third control state, in which the pressure medium power cylinder arrangement is sealed in a substantially pressure-medium-tight fashion, in dependence on a differential variable associated with the current variable and the control variable.

72. An operating device as defined in claim 1, wherein the control valve is provided so as to be externally accessible and removable.

73. An operating device as defined in claim 1, wherein the pressure medium is a pneumatic pressure medium.

74. An operating device as defined in claim 9, wherein the positioning servo means comprises one of a mechanical positioning control arrangement and a hydraulic positioning control arrangement.

75. An operating device as defined in claim 9, wherein the input element arrangement comprises at least one of a mechanically connected input element that detects the position of at least one of the clutch release bearing means and a hydraulic measurement cylinder arrangement operatively arranged inside the housing bell so as to detect the position of the clutch release bearing means.

76. An operating device as defined in claim 9, wherein the hydraulic measurement cylinder arrangement has exactly one measurement cylinder which is axis-parallel to the clutch axis.

* * * * *